United States Patent
Kachi

(10) Patent No.: US 9,385,543 B2
(45) Date of Patent: Jul. 5, 2016

(54) HYBRID STORAGE CELL, VEHICLE AND POWER STORAGE UNIT EMPLOYING SAME, SMART GRID VEHICLE SYSTEM EMPLOYING VEHICLE, AND POWER SUPPLY NETWORK SYSTEM EMPLOYING POWER STORAGE UNIT

(71) Applicant: Naoyoshi Kachi, Osaka (JP)

(72) Inventor: Naoyoshi Kachi, Osaka (JP)

(73) Assignee: CONNEXX SYSTEMS CORPORATION, Kyoto (JP)

( * ) Notice: Subject to any disclaimer, the term of this patent is extended or adjusted under 35 U.S.C. 154(b) by 269 days.

(21) Appl. No.: 14/239,745

(22) PCT Filed: Oct. 9, 2012

(86) PCT No.: PCT/JP2012/076149
§ 371 (c)(1),
(2) Date: Feb. 19, 2014

(87) PCT Pub. No.: WO2013/054795
PCT Pub. Date: Apr. 18, 2013

(65) Prior Publication Data
US 2014/0184159 A1    Jul. 3, 2014

(30) Foreign Application Priority Data

Oct. 11, 2011    (JP) ................. 2011-224070

(51) Int. Cl.
*H02J 7/00* (2006.01)
*H01M 10/44* (2006.01)
*H01M 16/00* (2006.01)
*B60L 1/00* (2006.01)
*B60L 1/02* (2006.01)
*B60L 3/00* (2006.01)
*B60L 7/12* (2006.01)
*B60L 7/14* (2006.01)
*B60L 11/18* (2006.01)
*B60L 15/20* (2006.01)
*H01M 10/052* (2010.01)
*H01M 10/06* (2006.01)
*H01M 4/58* (2010.01)

(52) U.S. Cl.
CPC ............... *H02J 7/0026* (2013.01); *B60L 1/003* (2013.01); *B60L 1/02* (2013.01); *B60L 3/0046* (2013.01); *B60L 7/12* (2013.01); *B60L 7/14* (2013.01); *B60L 11/1803* (2013.01); *B60L 11/1805* (2013.01); *B60L 11/1809* (2013.01); *B60L 11/1853* (2013.01); *B60L 11/1859* (2013.01); *B60L 11/1866* (2013.01); *B60L 15/2009* (2013.01); *H01M 10/052* (2013.01); *H01M 10/06* (2013.01); *H01M 10/44* (2013.01); *H01M 16/00* (2013.01); *B60L 2200/18* (2013.01); *B60L 2200/36* (2013.01); *B60L 2210/30* (2013.01); *B60L 2240/421* (2013.01); *B60L 2240/423* (2013.01); *B60L 2240/545* (2013.01); *B60L 2240/547* (2013.01); *B60L 2240/549* (2013.01); *H01M 4/5825* (2013.01); *Y02E 60/122* (2013.01); *Y02E 60/126* (2013.01); *Y02T 10/642* (2013.01); *Y02T 10/645* (2013.01); *Y02T 10/7005* (2013.01); *Y02T 10/7011* (2013.01); *Y02T 10/7016* (2013.01); *Y02T 10/7061* (2013.01); *Y02T 10/7241* (2013.01); *Y02T 10/7275* (2013.01)

(58) Field of Classification Search
CPC ... H02J 7/0026; H01M 10/06; H01M 10/052; B60L 11/1859; B60L 11/1809; B60L 3/0046; B60L 11/1803; B60L 11/1853; B60L 7/14; B60L 15/2009; B60L 11/1866; B60L 11/1805; B60L 1/02; B60L 7/12
USPC ....................................................... 320/109
See application file for complete search history.

(56) References Cited

U.S. PATENT DOCUMENTS

| | | | | |
|---|---|---|---|---|
| 5,612,606 | A * | 3/1997 | Guimarin | B60K 1/04 104/34 |
| 6,366,055 | B1 * | 4/2002 | Ookoshi | H02J 7/1423 320/106 |
| 6,680,600 | B2 * | 1/2004 | Emori | B60L 11/185 307/10.1 |
| 7,570,012 | B2 * | 8/2009 | Dasgupta | B60L 11/1809 320/104 |
| 8,581,557 | B2 * | 11/2013 | Kanoh | H02J 7/345 320/118 |
| 2014/0312687 | A1 * | 10/2014 | Gu | H01M 4/5825 307/10.1 |
| 2015/0010786 | A1 * | 1/2015 | Mauerer | H01M 2/1077 429/9 |
| 2015/0050527 | A1 * | 2/2015 | Jiang | H01M 10/0525 429/9 |
| 2015/0295420 | A1 * | 10/2015 | Cheng | H02J 7/0003 320/128 |
| 2015/0329007 | A1 * | 11/2015 | Matsunaga | H01M 10/0525 320/126 |

FOREIGN PATENT DOCUMENTS

| | | |
|---|---|---|
| JP | 10-154504 | 6/1998 |
| JP | 2002-25630 | 1/2002 |
| JP | 2003-164068 A | 6/2003 |
| JP | 2004-032871 | 1/2004 |
| JP | 2009-219310 A | 9/2009 |
| JP | 2010-097388 A | 4/2010 |

* cited by examiner

*Primary Examiner* — Jack Chiang
*Assistant Examiner* — Brandon Bowers
(74) *Attorney, Agent, or Firm* — Muncy, Geissler, Olds & Lowe, P.C.

(57) ABSTRACT

Provided is a hybrid storage cell that can prevent overcharge, despite lacking an expensive protection switch or other device adapted to deal with high current or high voltage, in order to proactively prevent rupture or ignition of lithium ion storage cells or other organic solution storage cells in the event of unforeseen overcharging. The cell comprises a plurality of series-connected virtual cells (32) of parallel-connected organic solution storage cells (24A) and aqueous solution storage cells (26A), the organic solution storage cells and the aqueous solution storage cells having closely approximating average discharge voltages. The overcharge threshold voltage of the organic solution storage cells is designed to be higher than the final discharge voltage of the aqueous solution storage cells, and the final discharge voltage of the organic solution storage cells to be lower than the final discharge voltage of the aqueous solution storage cells. In the event that the organic solution storage cells of a virtual cell are exposed to overcharge energy that could lead to overcharge, the energy is absorbed by a hydrogen-generating reaction of the aqueous solution storage cells, holding the discharge voltage of the virtual cell to the final discharge voltage of the aqueous solution storage cells, and preventing the organic solution storage cells from reaching the overcharge threshold voltage.

21 Claims, 6 Drawing Sheets

HYBRID STORAGE CELL, VEHICLE AND POWER STORAGE UNIT EMPLOYING SAME, SMART GRID VEHICLE SYSTEM EMPLOYING VEHICLE, AND POWER SUPPLY NETWORK SYSTEM EMPLOYING POWER STORAGE UNIT

TECHNICAL FIELD

The present invention relates to a hybrid storage battery comprising a plurality of series-connected virtual batteries each comprising an organic solution based battery such as a lithium-ion battery connected in parallel to an aqueous solution based battery such as a lead-acid battery, a vehicle and a power storage unit each employing the hybrid storage battery, a smart grid vehicle system employing such vehicle and power storage unit, and a power supply network system employing such power storage unit.

BACKGROUND ART

Conventional automobiles which use fossil fuels for the primary driving energy are exerting adverse effects on the earth's environment by emitting exhaust gases. In contrast, a wider use of electric cars which do not emit exhaust gases at all or hybrid cars which emit them in considerably reduced amounts holds much promise for improving the environment and is recommended from the viewpoint of effective utilization of surplus electricity generated at night. It is also desired to provide distributed power storage systems for stabilizing the supply of electrical power.

The conventional storage batteries, however, have involved serious problems such as extremely heavy weight or high cost. For example, aqueous solution based batteries such as lead-acid batteries which feature low unit price per energy are extremely heavy whereas organic solution based batteries such as lithium-ion batteries which feature high energy density and light weight are very expensive.

Organic solution based batteries such as lithium-ion batteries are less tolerant of overcharge and overdischarge and use flammable electrolytes, so if overcharged or overdischarged, they may potentially explode and suffer other danger on account of heat generation; hence, unlike aqueous solution based batteries such as lead-acid batteries, organic solution based batteries such as lithium-ion batteries usually need be individually provided with protective circuits and switches for protecting them against overcharge and/or overdischarge (see, for example, Patent Literatures 1 and 3).

According to the disclosure of Patent Literature 1, for example, lithium-ion batteries are mainly used for an assembled battery and cells of a lithium-ion battery are simply connected in series to make up an assembled battery or, alternatively, a plurality of cell groups each consisting of two or more cells connected in parallel are connected in series; in the former case, a protective circuit (anti-overdischarge circuit and/or anti-overcharge circuit) is provided for each cell, and in the latter case, the same protective circuit is provided for each cell group; in this way, capacity variations among individual cells or cell groups are reduced to be within an allowable range.

As a consequence, lithium-ion batteries are not only expensive on their own due to the high cost of the electrode materials; in addition, the overall cost is increased, largely by the electronic circuitry and components in the protective circuits and switches.

As disclosed in Patent Literature 1, the "protective circuits and switches" refers to protective circuits and switches that measure the cell or battery voltage and temperature as well as the current flowing through the cell or battery and which, when the measured value exceeds a specified level, causing the cell or battery to become exposed to an over-voltage, an over-temperature or an over-current, protects the cell or battery by cutting it off from the charging/discharging circuit.

Conventionally, such protective circuit and switches need not be used with lead-acid batteries but, as mentioned above, they are indispensable to lithium-ion batteries to avoid the risks of overcharge and overdischarge. When lithium-ion batteries are to be used on electric cars or power storage systems, their specified (rated) voltage and current are at least 10 times greater than the values specified for the ones that are used in mobile devices such as cell phones, laptop computers, and power tools and, as a consequence, the specifications of the protective circuits and switches need accordingly be adapted for high current and voltage but this requires provisions against heat, ohmic resistance, arc, etc. that considerably add to the overall cost.

To utilize the energy of fossil fuels effectively, it has been proposed that the energy generated from the deceleration of running vehicles such as automobiles but which is simply consumed as heat should be converted to electric energy as regenerative energy which is used to regenerate the current being supplied into a lead-acid battery (to charge it); in this case, for effective utilization of the regenerative energy, a lead-acid battery and a lithium-ion battery are connected in parallel to make a vehicular power supply system that is capable of accommodating a large regenerated current as produced from the braking such as deceleration of a running vehicle (see Patent Literatures 2 and 3).

According to Patent Literature 2, a lead-acid battery consisting of 18 series-connected cells and a lithium-ion battery consisting of 10-11 series-connected cells are connected in parallel to make a 42-V vehicular power supply system, in which in the process of charging by the braking such as deceleration of a running vehicle, the ratio of X/Y (where X is the value of a current flowing through the lead-acid battery incapable of accommodating a large current and Y is the value of a current flowing through the lithium-ion battery capable of accommodating a large current) is adjusted to lie between 0.05 and 1.00 so that the energy generated from the deceleration of running vehicles such as automobiles can be effectively utilized as regenerative energy.

According to Patent Literature 3, a lead-acid battery comprising a plurality of series-connected cells and a lithium-ion battery comprising a plurality of series-connected cells are connected in parallel to make a vehicular power supply system, wherein a safety circuit which, in the process of charging by the braking such as deceleration of a running vehicle, measures the voltage across each cell in the lithium-ion battery or the temperature of the lithium-ion battery and which, if the measured voltage value or the measured temperature exceeds a prescribed upper limit, finds the measurement abnormal and cuts off the charging or discharging of the lithium-ion battery, whereby the lithium-ion battery is protected from getting into an abnormal state to ensure the safety of the vehicular power supply system.

CITATION LIST

Patent Literature

Patent Literature 1: JP 3491473 B
Patent Literature 2: JP 2002-25630 A
Patent Literature 3: JP 2004-32871 A

SUMMARY OF INVENTION

Technical Problems

The assembled battery disclosed in Patent Literature 1 is designed to reduce capacity variations that might occur either among series-connected cells of a lithium-ion battery or among series-connected cell groups each consisting of parallel-connected cells; the problem, however, with this assembled battery is that an expensive protective circuit (anti-overdischarge circuit and/or anti-overcharge circuit) must be provided for each of the series-connected cells or cell groups, whereupon the cost of the assembled battery and, hence, the lithium-ion battery, is increased.

Using this assembled battery as a power source for driving electric cars is not at all assumed in Patent Literature 1, nor is this idea disclosed or suggested in the document; even if the use as a power source for driving electric cars is contemplated, the need to use a large number of assembled batteries will increase the cost of the electric car.

In contrast, the vehicular power supply systems disclosed in Patent Literatures 2 and 3 are used to supply an electric current to a starter motor (a vehicle starting gear) with which the engine of vehicles such as automobiles that use fossil fuels is started and they are intended to flow a large current into lithium-ion batteries connected in parallel to the lead-acid batteries in order to accommodate a large regenerated current as produced from the braking such as deceleration of a running vehicle that basically cannot be accommodated by the lead-acid batteries. To this end, the vehicular power supply system disclosed in Patent Literature 2, like the one disclosed in Patent Literature 3, presupposes the provision of safety circuitry such as protective circuits and switches that can protect lithium-ion batteries against the occurrence of any abnormality during charging/discharging such as overdischarge or overcharge.

Thus, the vehicular power supply systems disclosed in Patent Literatures 2 and 3 which need to provide lithium-ion batteries with safety circuitry such as protective circuits and switches have the problem of complicated configuration and, consequently, the cost of the lithium-ion batteries increases, making the power supply system expensive.

In addition, using the above-described vehicular power supply systems as a power source for driving electric cars is not at all assumed in Patent Literatures 2 and 3, nor is this idea disclosed or suggested in these documents; even if the use as a power source for driving electric cars is contemplated, the need to use a large number of protective circuits will increase the cost of the electric car.

It should be added that as mentioned above, the cost problem of lithium-ion batteries puts forward pressure on the price of electric cars, eventually slowing down their widespread use; as a consequence, not only users of electric cars but also car companies and operating companies such as ones doing business on battery replacement equipment (power storage unit) are yet to benefit from an adequate scale merit that might be obtained by widespread use of electric cars.

A first primary object of the present invention is to provide a hybrid storage battery comprising an organic solution based battery such as a lithium-ion battery in combination with an aqueous solution based battery such as a lead-acid battery; this hybrid storage battery solves the aforementioned problems of the prior art, in particular, the problem with organic solution based batteries such as lithium-ion batteries which are high in energy density and light in weight but which are expensive due to the need for protective circuits, etc. and the problem with aqueous solution based batteries such as lead-acid batteries which are inexpensive and high in power density but heavy in weight, in order to ensure that a steady supply of electric energy is accomplished by organic solution based batteries such as lithium-ion batteries whereas the supply of electric energy in cases that require large power is performed by aqueous solution based batteries such as lead-acid batteries and also to ensure that even without providing protective circuits having protective switches for protection against battery performance degradation and shortened life of organic solution based batteries such as lithium-ion batteries in anticipation of possible overcharge or overdischarge, in particular, against the risk of failures, such as bursts and fires, from overcharge, especially, without providing expensive protective switches and circuits adapted for accommodating large currents and voltages, organic solution based batteries such as lithium-ion batteries can be protected from performance degradation, shortened life, and other risks from overcharge and overdischarge, with the result that the configuration of organic solution based batteries such as lithium-ion batteries and, hence, the overall storage battery configuration can be simplified to ensure that not only organic solution based batteries such as lithium-ion batteries but also the storage battery taken as a whole can be considerably reduced in cost while at the same time, the power performance at cooler temperatures in particular can be sufficiently improved to enable the hybrid storage battery to be used not only as a power source for driving vehicles such as electric cars but also as an emergency power supply or a peak cutting power supply for local areas or various facilities including hospitals, hotels, office buildings, and schools.

In addition to the above-described primary object, the present invention has another object of providing a hybrid storage battery in which the portion consisting of organic solution based batteries such as lithium-ion batteries is detachable as a cassette module that allows for easy replacement and simple handling, thereby making the hybrid storage battery suitable for use not only as a power source for driving vehicles but also as an emergency power supply or a peak cutting power supply for the various facilities mentioned above.

A second primary object of the present invention is to provide a vehicle in which a hybrid storage battery that can attain the above-mentioned first primary object and another object may be used as a driving power source to ensure that the vehicle has high cost performance.

A third primary object of the present invention is to provide a smart grid vehicle system that uses a vehicle that can attain the above-mentioned second primary object and a power storage unit that is used as a power source for driving the vehicle and which serves as a replacement unit that stores many cassette modules of the portion of organic solution based batteries such as lithium-ion batteries that can attain the above-mentioned first primary object and another object, said smart grid vehicle system being further characterized in that the shutdown period for charging purposes can be entirely eliminated to improve the availability of the vehicle.

A fourth primary object of the present invention is to provide a power storage unit which, by storing lots of hybrid storage batteries that can attain the above-mentioned first object and another object, can be utilized not only as a distributed power supply or a stationary power supply but also as an emergency power supply or a peak cutting power supply for the various facilities mentioned above and which can also be utilized as replacement equipment by storing many cassette modules of the portion consisting of organic solution based batteries such as lithium-ion batteries in a hybrid storage battery that may be used as a power source for driving vehicles.

A fifth primary object of the present invention is to provide a power supply network in which a power storage unit that can attain the above-mentioned fourth primary object is able to supply electric power to a desired site such as one of the aforementioned facilities in case of emergency such as power failure, whereby the need for providing an emergency power supply within each of those facilities is eliminated to reduce the cost of supplying electric power in case of emergency.

Solution to Problems

In order to achieve the first primary object, the present invention provides in its first aspect a hybrid storage battery comprising a plurality of virtual batteries connected in series to each other and each comprising an organic solution based battery using an organic solution as electrolyte that is connected in parallel to an aqueous solution based battery using a aqueous electrolyte as electrolyte, wherein: the organic solution based battery and the aqueous solution based battery have average discharging voltages approximate to each other, and are so designed that a potentially overcharging voltage of the organic solution based battery is higher than a final charging voltage of the aqueous solution based battery and a final charging voltage of the organic solution based battery is lower than the final charging voltage of the aqueous solution based battery; the organic solution based battery becomes overcharged if it is charged beyond its final charging voltage, and gets into a dangerous state if it is charged beyond its potentially overcharging voltage, and the aqueous solution based battery becomes overcharged if it is charged beyond its final charging voltage; and when each of the plurality of virtual batteries is supplied with sufficient overcharging energy to get the organic solution based battery to become overcharged, the aqueous solution based battery carries out a hydrogen evolving reaction to absorb the overcharging energy so that a charging voltage of the virtual battery is suppressed to the final charging voltage of the aqueous solution based battery, thereby preventing the organic solution based battery from reaching its potentially overcharging voltage.

It is preferable that the organic solution based battery and the aqueous solution based battery are so designed that the average discharging voltage of the organic solution based battery lies between the final charging voltage of the aqueous solution based battery and the average discharging voltage of the aqueous solution based battery.

It is also preferable that the organic solution based battery and the aqueous solution based battery are so designed that the final discharging voltage of the organic solution based battery is higher than the final discharging voltage of the aqueous solution based battery.

In order to achieve the first primary object, the hybrid storage battery according to the first aspect of the invention is a hybrid storage battery comprising a plurality of virtual batteries connected in series to each other and each comprising a lithium-ion battery connected in parallel to a lead-acid battery, wherein: the lithium-ion battery and the lead-acid battery have average discharging voltages approximate to each other, and are so designed that a potentially overcharging voltage of the lithium-ion battery is higher than a final charging voltage of the lead-acid battery and a final charging voltage of the lithium-ion battery is lower than the final charging voltage of the lead-acid battery; the lithium-ion battery becomes overcharged if it is charged beyond its final charging voltage, and gets into a dangerous state if it is charged beyond its potentially overcharging voltage, and the lead-acid battery becomes overcharged if it is charged beyond its final charging voltage; and when each of the plurality of virtual batteries is supplied with sufficient overcharging energy to get the lithium-ion battery to become overcharged, the lead-acid battery carries out a hydrogen evolving reaction to absorb the overcharging energy so that a charging voltage of the virtual battery is suppressed to the final charging voltage of the lead-acid battery, thereby preventing the lithium-ion battery from reaching its potentially overcharging voltage.

It is preferable that the lithium-ion battery and the lead-acid battery are so designed that the average discharging voltage of the lithium-ion battery lies between the final charging voltage of the lead-acid battery and the average discharging voltage of the lead-acid battery.

It is also preferable that the lithium-ion battery and the lead-acid battery are so designed that the final discharging voltage of the lithium-ion battery is higher than the final discharging voltage of the lead-acid battery.

Preferably, the lithium-ion battery is a lithium iron phosphate battery that uses lithium iron phosphate as a cathode active material.

The inventive hybrid storage battery preferably includes a virtual battery balancer circuit adapted to adjust a state of charge of the plurality of virtual batteries connected in series to each other in a balanced manner, the virtual battery balancer circuit being provided for each virtual battery.

It is preferable that the lithium-ion battery comprises a plurality of series-connected lithium-ion cells or comprises a plurality of series-connected first cell groups each comprising a plurality of parallel-connected lithium-ion cells; and the hybrid storage battery includes a first cell balancer circuit adapted to bring a state of charge of the plurality of series-connected lithium-ion cells or the plurality of series-connected first cell groups to a same level.

It is also preferable that the lead-acid battery comprises a plurality of series-connected lead-acid battery cells or comprises a plurality of series-connected second cell groups each comprising a plurality of parallel-connected lead-acid battery cells; and the hybrid storage battery includes a second cell balancer circuit adapted to bring a state of charge of the plurality of series-connected lead-acid battery cells or the plurality of series-connected second cell groups to a same level.

The plurality of virtual batteries preferably have an operating voltage in a range of 9.0 V to 17.0 V or in a range of 18.0 V to 34.0 V.

The hybrid storage battery preferably has an operating voltage no more than 60 V.

It is preferable that energy supply from the hybrid storage battery is performed mainly from the lithium-ion battery in an early stage of discharging from a fully charged state, and performed from the lead-acid battery in a later stage of discharging from the fully charged state.

The lithium-ion battery or the plurality of lithium-ion batteries connected in series to each other are preferably in a form of a detachable and replaceable cassette module.

In order to achieve the second primary object, the present invention provides in its second aspect a vehicle equipped with the hybrid storage battery according to the first aspect as a driving energy source.

The inventive vehicle preferably recovers surplus energy during travel as regenerative electric power and uses it for charging the hybrid storage battery.

In order to achieve the third primary object, the present invention provides in its third aspect a smart grid vehicle system comprising: the vehicle according to the second aspect; and a power storage unit including one or more cassette modules of the organic solution based batteries or lithium-ion batteries as charged and stored, and a charger adapted to recharge the cassette module of the organic solution based battery or lithium-ion batteries that has discharged and is in need of replacement.

The power storage unit preferably includes a replacing means adapted to replace the cassette module of the organic solution based battery or lithium-ion batteries that has discharged and is in need of replacement and that is mounted on the vehicle by the cassette module of the organic solution based battery or lithium-ion batteries as charged and stored.

In order to achieve the fourth primary object, the present invention provides in its fourth aspect a power storage unit comprising: a plurality of the hybrid storage batteries according to the first aspect which are stored inside of the power storage unite; the cassette module of the organic solution based battery or lithium-ion batteries as charged which is stored inside of the power storage unite; and a charger adapted to recharge the cassette module of the organic solution based battery or lithium-ion batteries that has discharged, wherein the cassette module of the organic solution based battery or lithium-ion batteries as charged can be substituted for the cassette module of the organic solution based battery or lithium-ion batteries that has discharged and is in need of replacement, and wherein the power storage unit is connected to a power supply network connecting a plurality of facilities to be supplied with electrical power, and is used for power leveling and power storage.

In order to achieve the fifth primary object, the present invention provides in its fifth aspect a power supply network system comprising: the power storage unit according to the fourth aspect; a power supply network which connects the power storage unit and a plurality of facilities to be supplied with electrical power such that electrical power can be supplied from the power storage unit to the plurality of facilities to be supplied with electrical power; and a power supply command means that is individually installed in the plurality of facilities to be supplied with electrical power and which, in case of emergency, commands supply of electrical power to the power storage unit and manages a quantity of electrical power as supplied through the power supply network, thus controlling the supply of electrical power.

Advantageous Effects of Invention

According to the first aspect of the present invention, the aforementioned organic solution based batteries such as lithium-ion batteries, to which the aforementioned aqueous solution based batteries such as lead-acid batteries having sufficiently high resistance to overcharge that the electrolyte will decompose upon overcharge to prevent an increase in cell voltage are connected in parallel to make virtual batteries, are so designed that they have a potentially overcharging voltage higher than the final charging voltage of the aforementioned aqueous solution based batteries such as lead-acid batteries which evolve hydrogen to be capable of suppressing an increase in charging voltage whereas the final charging voltage of the aforementioned organic solution based batteries such as lithium-ion batteries is lower than that of the aforementioned aqueous solution based batteries such as lead-acid batteries; thus, even without providing protective circuits or switches for protection against battery performance degradation and shortened life of the aforementioned organic solution based batteries such as lithium-ion batteries in anticipation of possible overcharge or overdischarge, in particular, against any abnormality such as the risk of failures, for example, bursts and fires, from overcharge, especially, without providing expensive protective switches and circuits adapted for accommodating large currents and voltages, the aforementioned organic solution based batteries such as lithium-ion batteries having low resistance to overcharge can be protected from any battery abnormality due to overcharge, with the result that the configuration of the aforementioned organic solution based batteries such as lithium-ion batteries and, hence, the overall storage battery configuration can be simplified to ensure that not only the aforementioned organic solution based batteries such as lithium-ion batteries but also the storage battery taken as a whole can be considerably reduced in cost while at the same time, the power performance can be improved and particularly in the case of use at low temperatures, the power performance can be improved more than when only the aforementioned organic solution based batteries such as lithium-ion batteries are employed; additionally, in terms of energy density, efficiency in the recovery of regenerative power, and service life, the performance obtained is comparable to that of the aforementioned organic solution based batteries such as lithium-ion batteries.

Another advantage according to the first aspect of the present invention is that a steady supply of electric energy can be accomplished by the aforementioned organic solution based batteries such as lithium-ion batteries whereas the supply of electric energy in cases that require large power can be performed by the aforementioned aqueous solution based batteries such as lead-acid batteries; consequently, the hybrid storage battery of the invention can be used not only as a power source for driving vehicles such as electric cars but also as an emergency power supply or a peak cutting power supply for local areas and various facilities including hospitals, hotels, office buildings, and schools.

As a further advantage according to the first aspect of the present invention, the portion of the aforementioned organic solution based batteries such as lithium-ion batteries is detachable as a cassette module that allows for easy replacement without voltage drop and is handled conveniently, which makes the hybrid storage battery of the invention suitable for use not only as a power source for driving vehicles but also as an emergency power supply or a peak cutting power supply for the various facilities mentioned above.

According to the second aspect of the present invention, there can be provided a vehicle in which the hybrid storage battery according to the first aspect that has the aforementioned effects may be used as a driving power source to ensure that the vehicle has high cost performance.

As a further advantage according to the second aspect of the present invention, the portion of the aforementioned organic solution based batteries such as lithium-ion batteries in the hybrid storage battery according to the first aspect can be detached as a cassette module and replaced, typically in a power storage unit, whereby the time taken to charge the aforementioned organic solution based batteries such as lithium-ion batteries can be eliminated while at the same time, the cost of charging can also be reduced if it is performed by making use of inexpensive power generated at night, typically within the power storage unit.

According to the third aspect of the present invention, the vehicle according to the second aspect that has the above-mentioned effects and a power storage unit that is used as a power source for driving the vehicle and serves as a replacement unit that stores many cassette modules of the portion of the aforementioned organic solution based batteries such as lithium-ion batteries in the hybrid storage battery according to the first aspect that has the above-mentioned effects are employed such that the shutdown period for charging purposes can be entirely eliminated to improve the availability of the vehicle.

According to the fourth aspect of the present invention, there is provided a power storage unit which, by storing lots of hybrid storage batteries according to the first aspect that have the above-mentioned effects, can be utilized not only as a distributed power supply or a stationary power supply but also as an emergency power supply or a peak cutting power supply for the various facilities mentioned above and which can also be utilized as replacement equipment by storing many cassette modules of the portion of the aforementioned organic solution based batteries such as lithium-ion batteries in the hybrid storage battery according to the first aspect that may be used as a power source for driving vehicles.

According to the fifth aspect of the present invention, there is provided a power supply network in which electric power can be supplied to a desired site such as one of the above-mentioned facilities in case of emergency such as power failure from the power storage unit according to the fourth aspect that has the above-mentioned effects, whereby the need for providing an emergency power supply within each of those facilities is eliminated to reduce the cost of supplying electric power in case of emergency.

If the power storage unit according to the fourth aspect of the present invention is used as the one in the smart grid vehicle system according to the third aspect, there can be provided the power supply network system according to the fifth aspect of the present invention and this system can also work as a smart grid system capable of dual features.

It should be noted here that the power storage unit according to the fourth aspect of the present invention is required to accommodate even larger power and voltage levels than vehicles such as electric cars and, in this respect, a power storage system using the hybrid storage battery according to the first aspect of the present invention which needs no protective circuits and switches will prove even more advantageous.

The use of the power storage unit according to the fourth aspect of the present invention is by no means limited to the case where the unit serves the purposes of power leveling and power storage (i.e., local emergency power supply) as the power supply network system according to the fifth aspect of the present invention or a smart grid system; if it is used in such a way that the portion of the aforementioned organic solution based batteries such as expensive lithium-ion batteries is provided as a rental by battery replacement facility operating companies, car companies, etc., the sales price of the vehicle according to the second aspect of the present invention that employs the hybrid storage battery according to the first aspect of the present invention can be considerably lowered.

If the lowered sales price of the vehicle contributes to promoting the spread of the vehicle according to the second aspect of the present invention, the power storage unit according to the fourth aspect, the smart grid vehicle system according to the third aspect, and the power supply network system according to the fifth aspect, companies operating power storage units and other battery replacement facilities as well as car companies can benefit from an adequate scale merit due to such widespread use.

DESCRIPTION OF EMBODIMENTS

The hybrid storage battery according to the present invention, a vehicle and a power storage unit that employ the same, a smart grid vehicle system employing the vehicle, and a power supply network system employing the power storage unit are described below in detail by referring to the preferred embodiments illustrated in the accompanying drawings.

Figure 1:
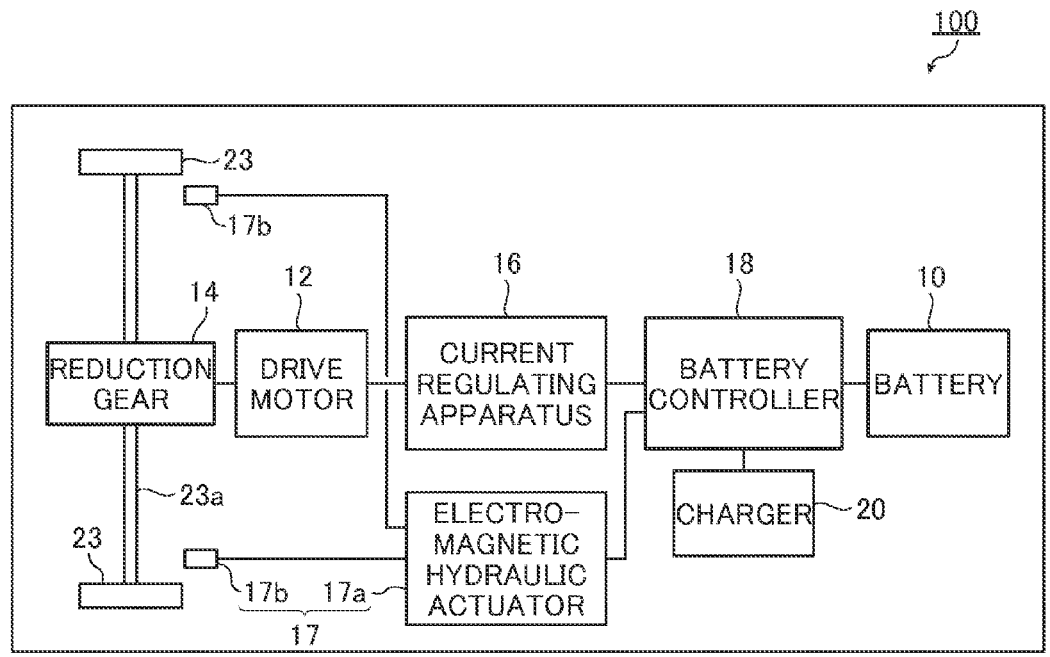
FIG. 1 is a block diagram showing schematically a structural outline of an embodiment of the vehicle of the present invention on which the hybrid storage battery according to the present invention is installed.
Figure 2:
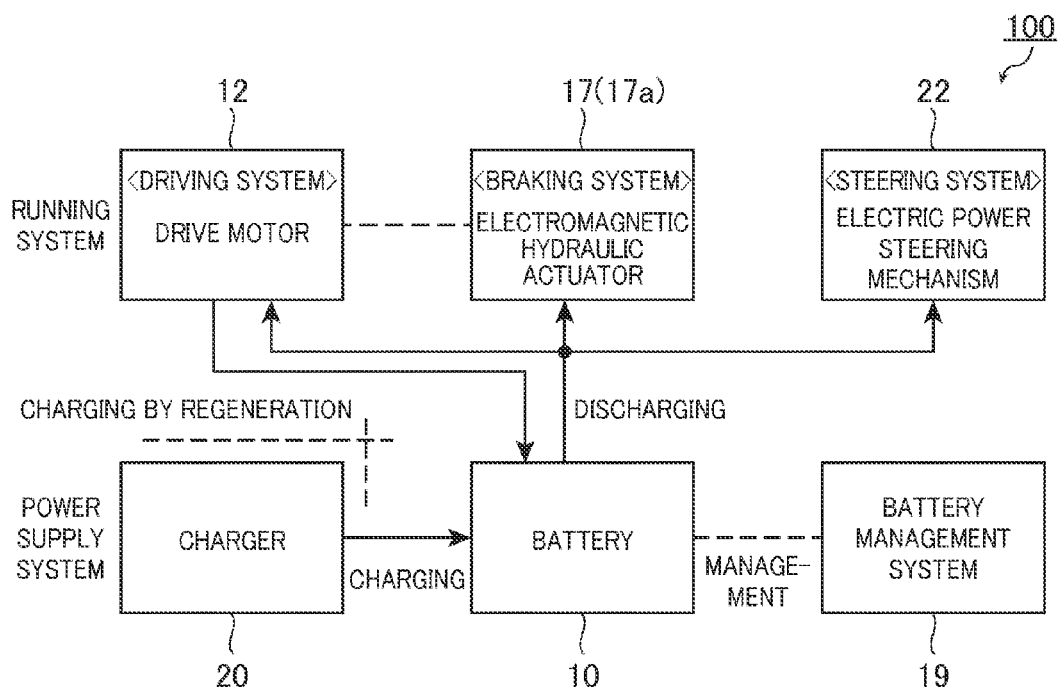
FIG. 2 is a block diagram illustrating the flow of electrical power in the vehicle shown in FIG. 1.
Figure 3:
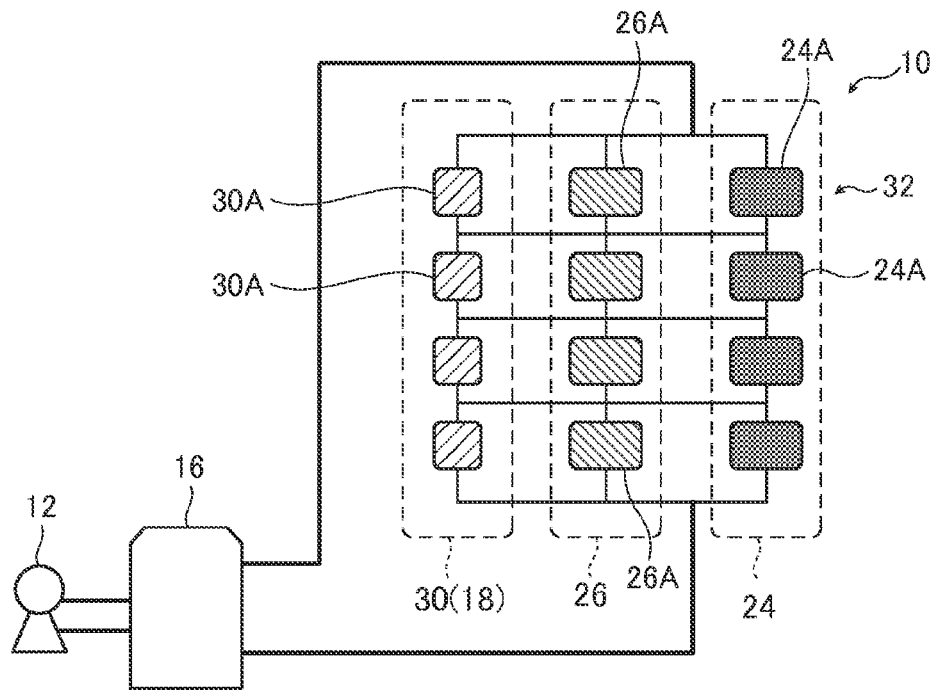
FIG. 3 is a schematic diagram showing an exemplary interconnection between the hybrid storage battery of the present invention, a current regulating apparatus and a motor in the vehicle shown in FIG. 1.
Figure 4:
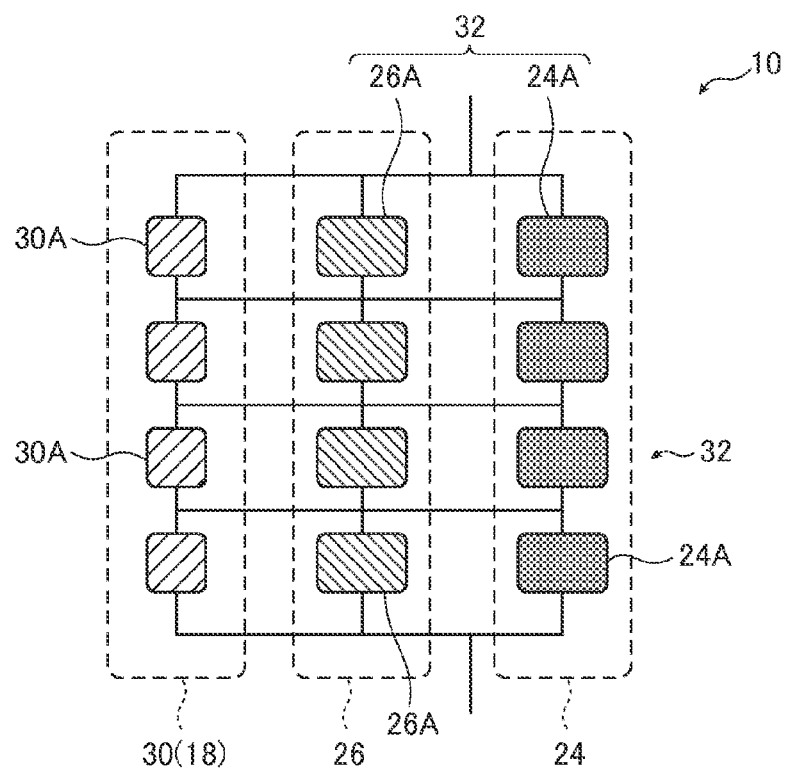
FIG. 4 is a schematic diagram showing a structural outline of an embodiment of the hybrid storage battery according to the present invention.

FIG. 1 is a block diagram showing schematically a structural outline of an embodiment of the vehicle according to the present invention on which the hybrid storage battery according to the present invention is installed; FIG. 2 is a block diagram illustrating the flow of electrical power in the vehicle shown in FIG. 1; FIG. 3 is a schematic diagram showing an exemplary interconnection between the hybrid storage battery of the present invention, a current regulating apparatus and a motor in the vehicle shown in FIG. 1; and FIG. 4 is a schematic diagram showing a structural outline of an embodiment of the hybrid storage battery according to the present invention.

An electric car indicated by 100 in FIG. 1 is an example of the vehicle of the present invention and it is a common electric car except that it has the hybrid storage battery of the present invention installed on it. Hence, a detailed description of the electric car 100 is omitted and it suffices here to say that it comprises the hybrid storage battery (hereinafter sometimes referred to simply as "battery") 10 of the present invention, a drive motor 12, a reduction gear 14, a current regulating apparatus 16, a braking apparatus 17, a battery controller 18, a charger (in-vehicle charger) 20, an electric power steering mechanism 22 (see FIG. 2), wheels 23, and other components not shown that include electric wirings, an air conditioner, a cooler, etc. In the illustrated case, the braking apparatus 17 has an electromagnetic hydraulic actuator 17a and friction brakes 17b.

These components of the electric car 100 are classified into a running system, a power supply system, and other systems not shown that include electric wiring system, air conditioning system, and cooling system. The running system consists of a driving system typically comprising the drive motor 12, the reduction gear 14, the current regulating apparatus 16 and the wheels 23; a braking system typically comprising the braking apparatus 17 having the electromagnetic hydraulic actuator 17a and the friction brakes 17b, and the drive motor 12 which functions as a generator so that it can work as a regenerative brake; and a steering system typically comprising the electric power steering mechanism 22. The power supply system typically comprises the battery 10, the battery controller 18, a battery management system 19 (see FIG. 2), and the charger 20.

FIG. 2 shows the flow of electrical power (electric energy) among the respective components of the running system and the power supply system in the electric car 100 shown in FIG. 1. The following are clear from FIG. 2: in the running system, it is the drive motor 12 in the driving system that is involved in the transfer of electrical power; it is the electromagnetic hydraulic actuator 17a in the braking system that is supplied with electrical power; and it is the electric power steering mechanism 22 in the steering system that is supplied with electrical power; in the power supply system, it is the battery 10 that discharges to supply electrical power into the drive motor 12, the electromagnetic hydraulic actuator 17a, and the electric power steering mechanism 22; it is the charger 20 typically connected to an external power supply that charges the battery 10; it is the battery management system 19 that includes the battery controller 18 (see FIG. 1) for controlling the charge/discharge of the battery 10 and which manages the status of the battery 10, for example, the state of it being charged or discharged. The individual components will be described later in this specification.

As FIG. 2 shows, while the electric car 100 is running, the electrical power discharged from the battery 10 is supplied into the drive motor 12, the electromagnetic hydraulic actuator 17a, and the electric power steering mechanism 22 in the running system; during regenerative braking of the electric car 100, the drive motor 12 charges regenerated energy (regenerated power) into the battery 10; during the charging of the electric car 100, external electrical energy is charged by means of the charger 20 typically connected to an external power supply.

With the battery controller 18 and other necessary components being omitted, FIG. 2 is drawn as if electrical power is directly supplied to the drive motor 12, etc. from the battery 10 which is directly charged from the charger 20 typically connected to an external power supply and from the drive motor 12; however, it goes without saying that the battery 10 supplies electrical power and becomes recharged via the battery controller 18 and even via other components.

To begin with, before describing the hybrid storage battery (or simply the battery) of the present invention, the components of the electric car 100 which is the vehicle of the present invention are described below by referring to the above-described components.

The driving system as referred to herein includes the components that are necessary for driving the drive motor 12 so that the electric car 100 is caused to run and as long as it typically comprises the drive motor 12, the reduction gear 14 and the current regulating apparatus 16 as in the illustrated case, the driving system is not particularly limited and may be of any known type that is commonly employed in electric cars.

The drive motor 12 is for supplying the wheels 23 with the power, torque, and number of revolutions that are necessary for causing the electric car 100 to run; during acceleration and constant-speed running of the electric car 100, the drive motor 12 is supplied with electrical power (electric energy) from the battery 10 so it functions as an electric motor to be driven in revolution whereas during deceleration of the electric car 100, the drive motor 12 functions as a generator that produces a sufficient braking torque to work as a regenerative brake. The drive motor 12 is not particularly limited as long as it develops the power, torque, and number of revolutions that are necessary for the electric car 100 and if it also functions as a generator so that it can work as a regenerative brake, and any known ac (alternating current) motor or dc motor for use in known electric cars may be employed, provided that an ac (alternating current) motor is preferably employed as from the viewpoint of maintenance.

The reduction gear 14 is a speed reducing apparatus used to reduce the number of revolutions of the drive motor 12 such that the torque required by the electric car 100 is obtained from the torque of the drive motor 12 and any known reduction gear that is typically used in automobiles may be employed. Suppose here that the reduction gear 14 has a gear ratio R represented by Nm/Ne, where Nm is the number of revolutions of the drive motor 12 and Ne is the number of revolutions of the wheels 23 (drive axle 23a) that the electric car 100 requires; the torque Tm of the drive motor 12 and the torque Te that the electric car 100 requires can be correlated by Tm=Te/R.

If the torque Tm of the drive motor 12 satisfies the torque Te that the electric car 100 requires, there is no need to provide the reduction gear 14 and the drive axle 23a may be directly driven by the drive motor 12 but then this requires the use of a larger and heavier drive motor 12; hence, it is preferred to provide the reduction gear 14.

The current regulating apparatus 16 is for ensuring that the torque and number of revolutions of the drive motor 12 are variably regulated to the required torque and number of revolutions in accordance with the state in which the electric car 100 is operated and it may be of any known type that is typically employed in electric cars; in the case of a dc motor, the current regulating apparatus 16 may be of such a type that the dc voltage and dc current through the battery 10 can be converted to the electrical power required for driving the dc motor; in the case of an ac motor in which the number of revolutions depends on the power frequency, an inverter circuit by which the dc voltage and dc current through the battery 10 are converted to ac to allow for variable control of frequency and voltage is used as a power converter circuit. As such inverter circuit, any known inverter that is typically employed in electric cars may be used.

The braking system includes the components necessary for reducing the number of revolutions of the wheels 23 (drive axle 23a) or stopping the rotation of the wheels 23 in order to decelerate or stop the running electric car 100 and as long as it typically comprises the breaking apparatus 17 and the drive motor 12 which is to be operated as a regenerative brake as in the illustrated case, the driving system is not particularly limited and may be of any known type that is employed in electric cars.

The braking apparatus 17 is for decelerating or stopping the rotating wheels 23 by an external force such as friction and includes the electromagnetic hydraulic actuator 17a and the friction brakes 17b; the electromagnetic hydraulic actuator 17a is for performing electronic control such that the friction brakes 17b are brought into direct contact with the respective rotating wheels 23 for applying a braking action on their rotation by means of friction. It should be noted here that as long as the rotating wheels 23 can be decelerated or stopped by an external force such as friction, the braking apparatus 17, electromagnetic hydraulic actuator 17a and friction brakes 17b are not particularly limited and those that are used in common automobiles may be employed.

As explained above, during the braking of the electric car 100, the drive motor 12 is caused to generate a braking torque and serve as a regenerative brake, that is to say, the drive motor 12 functions as a generator, whereby electric energy is recovered as regenerative energy (regenerative power) that is used to charge the battery 10 in which it is stored.

During slow braking of the electric car 100 for achieving normal (slow) deceleration, in order to improve the running energy efficiency, the regenerative brake is preferably used as much as possible so that the electric energy stored in the battery 10 is effectively utilized; on the other hand, during rapid deceleration, so-called "sudden braking," and slow-speed running, the regenerative brake alone is unable to provide a sufficient braking force and, hence, it is preferred that the friction brakes 17b in the braking apparatus 17 are mainly used while the regenerative brake is used as an auxiliary means for recovering the regenerative energy. Thus, the electric car 100 is preferably controlled in such a way that the regenerative braking by the drive motor 12 is predominantly applied in one state of braking whereas the friction brakes 17b in the braking apparatus 17 are predominantly applied in another state of braking.

The above-described components of the running system are operated in the manner indicated by arrows in FIG. 2; they are operated in response to discharge (supply of electrical power) from the battery 10 which is the hybrid storage battery of the present invention; in the braking system, the drive motor 12 in the driving system is allowed to work as a regenerative brake, hence, as a generator; the regenerative energy (regenerative power) as generated during regenerative braking is used to charge the battery 10.

To recover the regenerative power based on the regenerative energy generated during regenerative braking, various known configurations may be used depending upon the configuration of the electric car 100.

The steering system includes the components necessary for changing the course of the running electric car 100 in accordance with various driving circumstances as on the road and the parking lot, and as long as it typically comprises a steering wheel (not shown) and the electric power steering mechanism 22 as shown, the steering system is not particularly limited and there may be employed any known steering systems for use in electric cars that typically comprise known steering wheels and electric power steering mechanisms.

Although not shown in FIG. 2, other applicable systems include an electric wiring system comprising lights, defoggers and various types of motors, etc., an air-conditioning (heating/cooling) system comprising an electric compressor, a blower, a heater, etc., and a cooling system comprising an electric pump, etc.; as in the case described above, these systems operate in response to discharge from the battery 10.

These electric wiring, air-conditioning, cooling, and other systems are not particularly limited and known systems that are typically used in common automobiles may of course be employed.

We next describe the power supply system. This is the characterizing portion of the present invention and includes the components necessary for supplying the drive motor 12 with driving electrical energy in order to make the electric car 100 run; it typically comprises the battery 10 which is the hybrid storage battery as the most characteristic feature of the present invention, the battery management system 19 (see FIG. 2) comprising the battery controller 18, and the charger 20.

Remember that the battery 10 is the hybrid storage battery of the present invention.

In the following description, lithium-ion batteries and lead-acid batteries are used as typical examples of the organic solution based batteries and the aqueous solution based batteries, respectively, that compose the hybrid storage battery of the present invention, but needless to say, the present invention is by no means limited to these cases.

As shown in FIG. 3, the battery 10 has a lithium-ion battery portion 24 consisting of plural (four in the illustrated case) lithium-ion batteries 24A and a lead-acid battery portion 26 consisting of plural (four in the illustrated case) lead-acid batteries 26A. A detailed description of the battery 10 will be given later and it suffices here to say that, as shown in FIG. 2, the battery 10 discharges to supply electric energy into the respective components of the running system which typically comprises the drive motor 12, the electromagnetic hydraulic actuator 17a in the braking apparatus 17, and the electric power steering mechanism 22, as well as the components of other systems; the battery 10 is charged with regenerative power; and that, if the battery 10 having a predetermined charging capacity (amount of electricity acceptable to the battery to be charged) continues to discharge until the charged ampere-hour or the residual power of the battery 10 (meaning the amount of electricity currently remaining in the battery 10) reaches a prescribed charging level (prescribed amount of electricity), the battery 10 is charged by connecting the charger (in-vehicle charger) 20 installed on the electric car 100 onto an external power supply (not shown) or the like. The battery 10 may be rapidly charged by an external charger (not shown) such as an external quick charger that is connected to a power supply (not shown).

The battery controller 18 controls the battery 10 under management by the battery management system 19 and includes virtual battery balancer circuits 30A adapted to bring the state of charge of individual virtual batteries 32, which each consist of one lithium-ion battery 24A and one lead-acid battery 26A in the battery 10 as connected in parallel and which are connected in series to create high voltage, to the same level or render it into balance. The battery controller 18 controls the discharging of the battery 10 in order to supply electrical energy into the respective components of the running and other systems and to ensure protection against any battery abnormality due, for example, to overdischarge, such as battery performance degradation and shortened life, in particular, against the risk of failures, such as bursts and fires, from overcharge, and controls the charging of the battery 10 with regenerative power as well as the charging of the battery 10 by the charger 20 in order to ensure protection against any battery abnormality due, for example, to overcharge.

Including the battery controller 18, the battery management system 19 controls and manages the charging/discharging of the battery 10 via the battery controller 18; in addition, it manages the state of the battery 10, such as the charged state or discharging state, and furthermore, it controls the supply of energy from the battery 10, as well as the charging of the battery 10 with the regenerative energy (regenerative power) due to regenerative braking from the drive motor 12 working as a regenerative brake and serving as a generator.

In order to control the charging method, charging conditions or charging state so that the battery 10 will be charged by the prescribed method or to enable observation of the state of each of the lithium-ion batteries 24A, lead-acid batteries 26A and the virtual batteries, for instance, the battery management system 19 may include temperature sensors, voltage/current sensors, and other devices for measuring the cell voltage or temperature as well as current; if desired, the battery management system 19 may also have a capability for outputting the data of measurements.

If lithium-ion batteries 24A are used in the prior art, it has been required that each lithium-ion battery 24A be provided with protective circuits or switches to prevent battery's overcharge, overdischarge, etc., in particular, any abnormality due to overcharge; in the present invention, however, for the reasons to be given later, the lithium-ion batteries 24A need no protective circuits or switches for preventing any abnormality due to overcharge and, hence, neither the battery controller 18 nor the battery management system 19 includes any protective circuits or switches.

The charger 20, mounted on the electric car 100, is connected to an external power supply, such as a household power supply (e.g. ac 100-V supply) or an institutional power supply (e.g. ac 100-V or 200-V supply at plants, shops, etc.), and it is used to charge the battery 10 by a prescribed method under prescribed conditions. Basically, the charger 20 charges the batteries in the battery 10 by charging methods that are compatible with their types.

In the present invention, the lithium-ion batteries 24A in the lithium-ion battery portion 24 used in the battery 10 are discharged faster than the lead-acid batteries 26A in the lead-acid battery portion 26, so when the charging level of the lithium-ion battery 24A has dropped to a value equal to or lower than a predetermined value, the method of charging the lithium-ion battery 24A is adopted: if the residual battery power (currently charged ampere-hour) is small, constant-current charging is performed; and, in a state of almost full charge (at a voltage close to the final charging voltage) (that is to say, if the currently charged ampere-hour is close to the capacity of the lithium-ion battery 24A), constant-voltage charging is performed. In these modes of constant-current/constant-voltage charging of the lithium-ion battery 24A, settings are so provided that, in a state of almost full charge, constant-voltage charging is performed to ensure that the lithium-ion battery 24A will not get into an abnormal state due to overcharge and that there will be no vigorous evolution of gases (oxygen and hydrogen) from the lead-acid battery 26A.

The charger 2 may be of a built-in type that is provided within the electric car 100; alternatively, it may be provided outside the electric car 100 or accommodated in the trunk or some other area of the electric car 100 so that charging may be performed with the charger 20 being connected to an external power supply and the battery 10.

If desired, the battery 10 which consists of the hybrid storage battery of the present invention may be charged by an external charging unit, for example, a charging unit 36 that is provided in an external power storage unit 200 such as the battery replacement facility (also called "battery depot") to be described later in this specification.

We next describe the hybrid storage battery of the present invention more specifically.

As shown in FIGS. 3 and 4, the battery 10 consists of the hybrid storage battery of the present invention, in which plural (four in the illustrated case) virtual batteries each consisting of parallel-connected lithium-ion battery 24A and lead-acid battery 26A are connected in series.

As just mentioned above, it is required for the battery 10 of the present invention that one lithium-ion battery 24A should be connected in parallel to one lead-acid battery 26A to make one virtual battery 32. Since the plural (four in the illustrated case) virtual batteries 32 are connected in series, the lithium-ion battery portion 24 consisting of plural (four in the illustrated case) series-connected lithium-ion batteries 24A and the lead-acid battery portion 26 consisting of plural (four in the illustrated case) series-connected lead-acid batteries 26A may be composed in two units so that the lithium-ion batteries 24A are parallel-connected to the lead-acid batteries 26A, respectively. The advantage of forming two units in this way is that batteries of the same type can be handled as an integral unit and this offers an especial benefit in that a cassette module can easily be made of the lithium-ion battery portion 24 as will be described later.

Since each of the virtual batteries 32 in the battery 10 of the present invention has a virtual battery balancer circuit 30A connected in parallel thereto, the virtual battery balancer circuits 30A in the battery management system 19 (battery controller 18), lithium-ion batteries 24A and lead-acid batteries 26A are connected in parallel. Here again the plural (four in the illustrated case) series-connected virtual battery balancer circuits 30A may be used as a single unit in the form of a virtual battery balancer circuit portion 30. The advantage of using the virtual battery balancer circuit portion 30 as a single unit is that the virtual battery balancer circuits 30A can be handled easily as an integral unit.

In the present invention, the lithium-ion battery 24A and lead-acid battery 26A that are connected in parallel to make the virtual battery 32 must be so designed that they have average discharging voltages (average operating voltages) that are approximate to each other. Since the voltage of discharging that takes place during use of a battery may be described as an operating voltage that is required to operate the device connected to the battery, the average discharging voltage may be referred to as the average operating voltage. As will be clear from the graph of FIG. 6 to be described later which illustrates the profiles of charging/discharging voltage for the lithium-ion battery 24A and the lead-acid battery 26A by curves La and Lb, respectively, discharging lasts for a prolonged period of time, during which the voltage between the terminals of positive and negative cell electrodes, or the discharging voltage, decreases gradually (see region C of curve La and region E of curve Lb in the graph of FIG. 6), so the term "average discharging voltage" means the average of that discharging voltage; in fact, however, given the fact that the voltage drop due to discharging is substantially uniform, the average discharging voltage may for practical purposes be represented by the voltage across terminals of each battery at an approximately 50% state of charge.

The battery 10 of the present invention is to be connected to a load having a predetermined voltage rating, for example, the drive motor 12 in the running system of the electric car 100 and to this end, each virtual battery 32 has to accommodate a divided voltage, or the predetermined voltage rating divided by the number of virtual batteries 32 (which is four in the illustrated case); since the lithium-ion battery 24A and lead-acid battery 26A that make each virtual battery 32 are connected in parallel, both batteries have to accommodate the divided voltage. Hence, when we say that the lithium-ion battery 24A and lead-acid battery 26A have average discharging voltages (average operating voltages) that are approximate to each other, it is implied that when the battery 10 of the present invention is connected to a prescribed load, both batteries can sometimes accommodate the divided voltage of a predetermined value, i.e., both may be capable of driving the load upon discharging.

The next requirement that must be satisfied by the present invention is that the lithium-ion battery 24A and lead-acid battery 26A that are connected in parallel to make the virtual battery 32 should be so designed that the potentially overcharging voltage of the lithium-ion battery 24A is higher than the final charging voltage of the lead-acid battery 26A whereas the final charging voltage of the lithium-ion battery 24A is lower than the final charging voltage of the lead-acid battery 26A.

Figure 6:
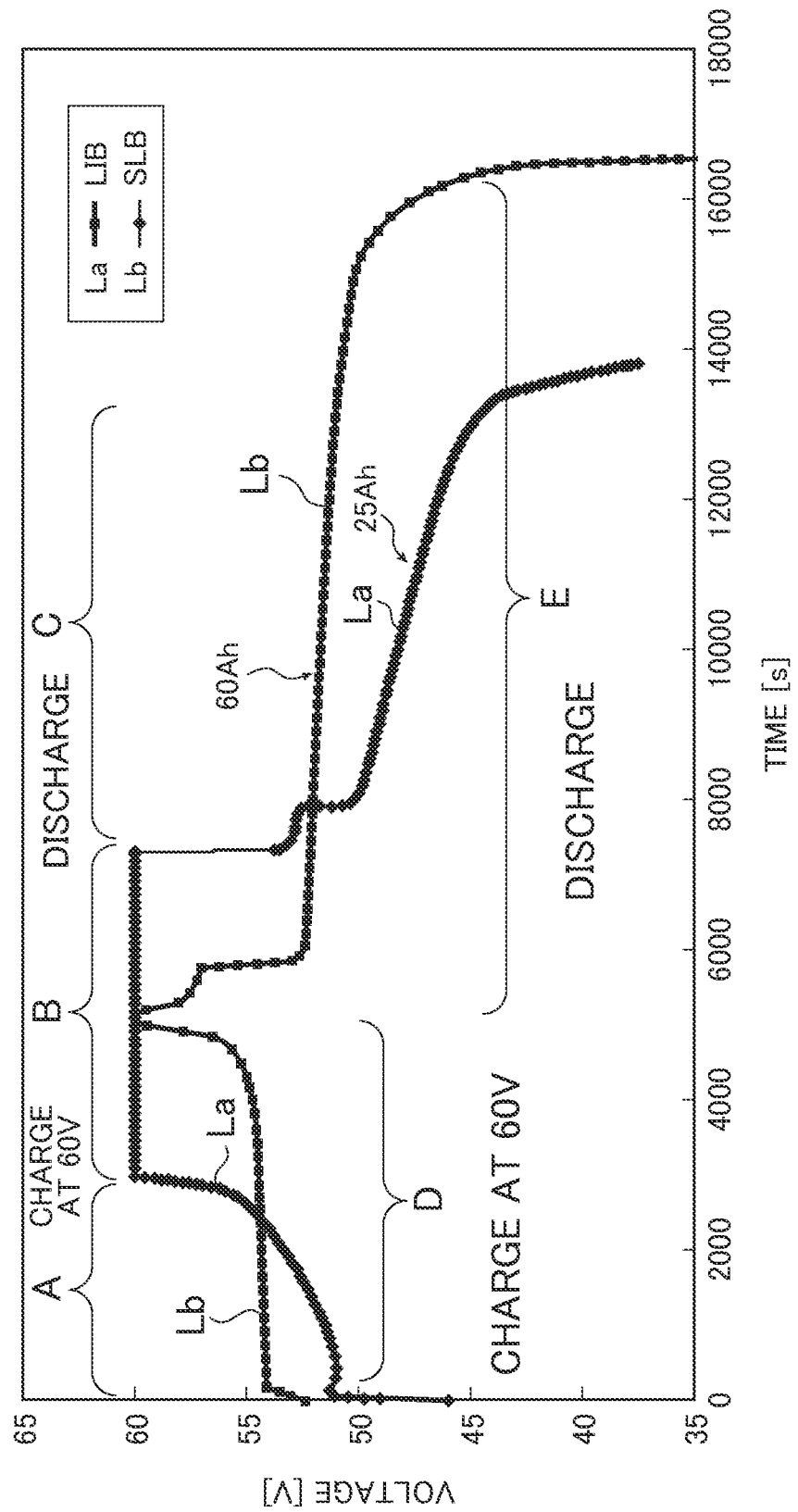
FIG. 6 is a graph showing the charging/discharging voltage behaviors of a 48-V class lead-acid battery and a 48-V class lithium iron phosphate battery that are used in the hybrid storage battery shown in FIG. 4.

The "potentially overcharging voltage of the lithium-ion battery 24A" as used herein means a charging voltage beyond which the lithium-ion battery 24A cannot be charged without potentially suffering some abnormality such as the risk of failures, for example, bursts and fires, from overcharge; the "final charging voltage of the lithium-ion battery 24A" as used herein means a charging voltage beyond which the lithium-ion battery 24A cannot be charged without potentially becoming overcharged (see the voltage level which is a bit lower than the peak voltage occurring in region E on the border with region D of curve Lb in the graph of FIG. 6 to be described later) and the final charging voltage of this sense may also be called a complete charging voltage or a full charging voltage.

The "final charging voltage of the lead-acid battery 26A" as used herein means a charging voltage beyond which the lead-acid battery 26A cannot be charged without potentially becoming overcharged (see the voltage in flat region B of curve La in the graph of FIG. 6 to be described later) and the final charging voltage of this sense may also be called a complete charging voltage or a full charging voltage; in other words, it is the voltage at which the charger is set for charging the lead-acid battery 26A.

The reason that the battery 10 of the present invention is so designed that the potentially overcharging voltage of the lithium-ion battery 24A is higher than the final charging voltage of the lead-acid battery 26A is as follows: when the battery 10 of the present invention is being charged by regenerative power, for example, the lithium-ion battery 24A will be charged and even if the charging voltage, increasing on account of abnormal charging or any other trouble, reaches the final charging voltage of the lead-acid battery 26A, electrolysis of the aqueous solution in the lead-acid battery 26A will cause hydrogen to evolve from the electrode and the charging voltage will not increase any further unless all of the aqueous solution is electrolyzed.

Thus, according to the present invention, the battery performance degradation and shortened life of the lithium-ion battery 24A on account of accidental overcharge, in particular, any abnormality such as the risk of failures, for example, bursts and fires, from overcharge, that may cause so serious performance deterioration as to make the lithium-ion battery 24A no longer usable to thereby pose a safety problem can be prevented by the evolution of hydrogen in the lead-acid battery 26A. Thus, any abnormality of the lithium-ion battery 24A that might result from accidental overcharge can be prevented without using expensive protective circuits or switches that have conventionally been indispensable to the lithium-ion battery 24A from the viewpoint of safety. Needless to say, vigorous hydrogen evolution in the lead-acid battery 26A will reduce its performance and may even sometimes turn out hazardous, so the battery 10 of the present invention is so designed that the state of charging is managed by the battery management system 19 to stop the progress of charging if hydrogen evolution becomes excessive.

The reason the battery 10 of the present invention is so designed that the final charging voltage of the lithium-ion battery 24A is lower than the final charging voltage of the lead-acid battery 26A is because the lithium-ion battery 24A must be fully charged without causing hydrogen to evolve from the lead-acid battery 26A.

In the present invention, the lithium-ion battery 24A and lead-acid battery 26A that are connected in parallel to make up the virtual battery 32 are preferably so designed that the average discharging voltage of the lithium-ion battery 24A lies between the final charging voltage of the lead-acid battery 26A and the average discharging voltage of the lead-acid battery 26A, and in another preferred embodiment, the lithium-ion battery 24A and lead-acid battery 26A are so designed that the final discharging voltage of the lithium-ion battery 24A is higher than that of the lead-acid battery 26A.

The "final discharging voltage of the lithium-ion battery 24A" as used herein means a discharging voltage below which the lithium-ion battery 24A cannot be discharged without potentially becoming overdischarged (see the voltage level at the right end of region E of curve Lb in the graph of FIG. 6 to be described later) and the final discharging voltage of this sense may also be called a complete discharging voltage. The "final discharging voltage of the lead-acid battery 26A" as used herein means a discharging voltage below which the lead-acid battery 26A cannot be discharged without potentially becoming overdischarged (see the voltage level at the right end of region C of curve La in the graph of FIG. 6 to be described later) and the final discharging voltage of this sense may also be called a complete discharging voltage.

The reasons for the above-described design are as follows: if the average discharging voltage of the lithium-ion battery 24A lies between the final charging voltage of the lead-acid battery 26A and the average discharging voltage of the lead-acid battery 26A, or if the final discharging voltage of the lithium-ion battery 24A is higher than that of the lead-acid battery 26A, the supply of energy by discharging from the battery 10 of the present invention can be performed mainly from the lithium-ion battery 24A in the early stage of discharge from a fully charged state and from both the lithium-ion battery 24A and lead-acid battery 26A in the middle to the later stage of discharge from a fully charged state, and the lithium-ion battery 24A which has the higher resistance to abnormality due to overdischarging reaches the end of discharge earlier than the lead-acid battery 26A which has the lower resistance to abnormality due to overdischarging. The "early stage of discharge" as used herein means discharging in the period immediately after the fully charged state of the battery 10 toward the state where the battery 10 remains charged in high percentage, and the "later stage of discharge" means discharging of the battery 10 whose state of charge is in low percentage after it has been substantially discharged from the fully charged state.

If the battery 10 of the present invention is designed to satisfy the above-described conditions, the following advantages will result: in cases that require power of high energy density or a stable supply of constant power as when the electric car 100 is cruising or running at constant speed, the lithium-ion battery 24A (lithium-ion battery portion 24) can be predominantly discharged whereas in a case that requires high-power energy, or electrical power, as when the electric car 100 is accelerating, the lead-acid battery 26A (lead-acid battery portion 26) can be predominantly discharged; in other words, the battery 10 of the present invention is highly adaptive to loads that must be supplied with various states of energy. As a further advantage, even if high-power electrical power is supplied from the battery 10 of the present invention and if the discharging lead-acid battery 26A (lead-acid battery portion 26) suffers a drop in its cell power, the lead-acid battery 26A can be charged from the lithium-ion battery 24A. Should the battery 10 be overdischarged accidentally, it is the more tolerant lithium-ion battery 24A that first becomes overdischarged and the less tolerant lead-acid battery 26A which would be greatly damaged by abnormality due to overdischarging will become overdischarged only at a later time.

By the design that satisfies the above-described conditions, the following advantages are obtained: in cases that require power of high energy density or a stable supply of constant power as when the electric car 100 is cruising or running at constant speed, the lithium-ion battery 24A (lithium-ion battery portion 24) can be predominantly discharged whereas in a case that requires high-power energy, or electrical power, as when the electric car 100 is accelerating, the lead-acid battery 26A (lead-acid battery portion 26) can be predominantly discharged; in other words, the battery 10 of the present invention is highly adaptive to loads that must be supplied with various states of energy. As a further advantage, even if high-power electrical power is supplied from the battery 10 of the present invention and if the discharging lead-acid battery 26A (lead-acid battery portion 26) suffers a drop in its cell power, the lead-acid battery 26A can be charged from the lithium-ion battery 24A.

Figure 5:
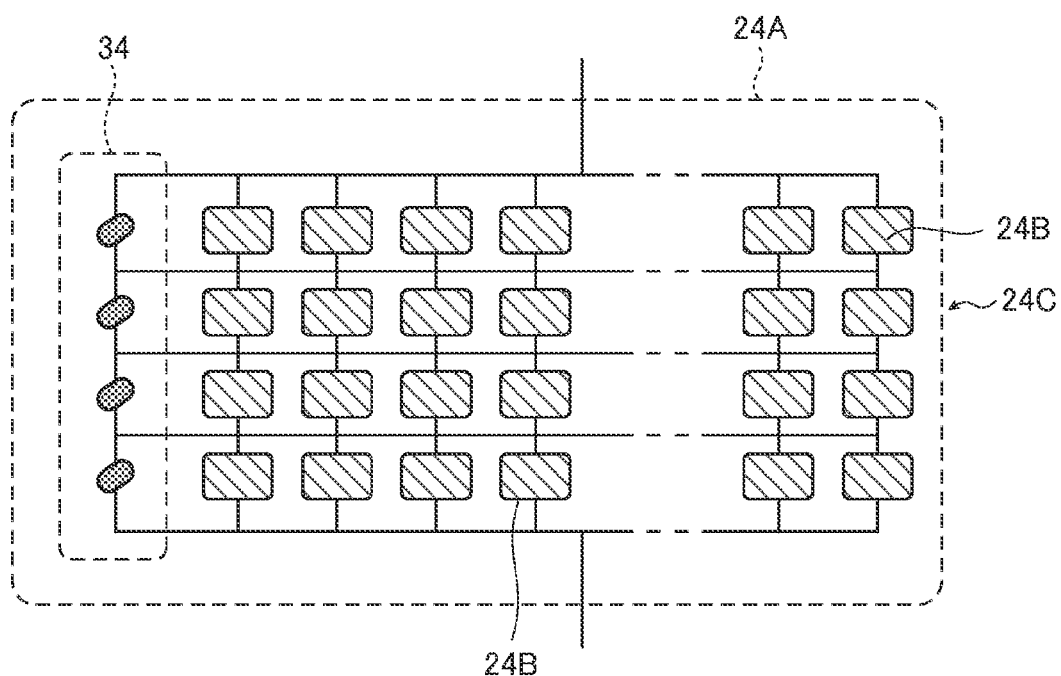
FIG. 5 is a schematic diagram showing a structural outline of an embodiment of lithium-ion batteries in the hybrid storage battery shown in FIG. 4.

In the battery 10 of the present invention, the lithium-ion battery 24A may consist of a single lithium-ion cell or it may consist of plural lithium-ion cells connected in series to provide a predetermined voltage; alternatively, as shown in FIG. 5, a plurality of lithium-ion cells 24B may be connected in parallel to make a lithium-ion cell group 24C and plural (four in the illustrated case) such lithium-ion cell groups are connected in series to provide a predetermined voltage.

In the case where plural lithium-ion cells are connected in series to provide a predetermined voltage, a cell balancer circuit for bringing the state of charge of the series-connected plural lithium-ion cells to the same level is preferably provided in parallel connection to each lithium-ion cell. In the case shown in FIG. 5 where plural (four in the illustrated case) lithium-ion cell groups 24C are connected in series to provide a predetermined voltage, a cell balancer circuit 34 for bringing the state of charge of the series-connected plural lithium-ion cell groups 24C to the same level is preferably provided in parallel connection to each lithium-ion cell group 24C.

In the battery 10 of the present invention, the lead-acid battery 26A may consist of a single lead-acid battery cell or it may consist of plural lead-acid battery cells that are connected in series to provide a predetermined voltage; alternatively, plural lead-acid battery cells may be connected in parallel to make a lead-acid battery cell group and a plurality of such lead-acid battery cell groups are connected in series to provide a predetermined voltage. The lead-acid battery 26A is available in various types including valve-regulated, sealed, and non-sealed types, and in the present invention which is by no means limitative, a suitable type may be chosen depending on the use and other factors.

In the case where a plurality of lead-acid battery cells are connected in series to provide a predetermined voltage, a cell balancer circuit for bringing the state of charge of the series-connected plural lead-acid battery cells to the same level is preferably provided in parallel connection to each lead-acid battery cell. If a plurality of lead-acid battery cell groups are connected in series to provide a predetermined voltage, a cell balancer circuit for bringing the state of charge of the series-connected plural lead-acid battery cell groups to the same level is preferably provided in parallel connection to each lead-acid battery cell group.

In the battery 10 of the present invention, the number of virtual batteries 32 to be connected in series, the number of lithium-ion cells to be connected in series or the number of lithium-ion cell groups 24C to be connected in series to make the lithium-ion battery 24A, and the number of lithium-ion cells 24B to be connected in parallel to make the lithium-ion cell group 24C, as well as the number of lead-acid battery cells to be connected in series or the number of lead-acid battery cell groups to be connected in series to make the lead-acid battery 26A, and the number of lead-acid battery cells to be connected in parallel to make the lead acid battery cell group are not particularly limited and may be set as appropriate for satisfying the required conditions of the present invention depending upon the voltage required of the battery 10, namely, the voltage necessary for driving the load.

The lithium-ion battery 24A to be used in the present invention may be exemplified by a lithium iron phosphate battery that uses 3.3-V class lithium-ion cells which use lithium iron phosphate ($LiFePO_4$) as a cathode active material and a carbon- or silicon-based active material for negative electrode, with a single cell having an average operating voltage of 3.3 V (this type of battery is hereinafter sometimes referred to as a LFPO-type lithium-ion battery) or a lithium-ion battery that uses 3.6-V class lithium-ion cells which typically use NMC, NCA, LCO or LMO as a cathode active material, with a single cell having an average operating voltage of 3.6 V; while any types of lithium-ion battery may be employed if they satisfy the required conditions of the present invention, the LFPO-type lithium-ion battery is preferably used in the present invention. The α-V class as referred to above shall mean a cell having an average operating voltage of α V.

On the other hand, the lead-acid battery 26A to be used in the present invention is not particularly limited and any conventionally known lead-acid batteries may be employed.

A commercially available lead-acid battery is of 12-V class, in which six 2-V class cells each having an average operating voltage of 2 V are series-connected to provide an average operating voltage of 12 V, so this 12-V class lead-acid battery is used as the lead-acid battery 26A. As for the lithium-ion battery 24A, the number of series-connected lithium-ion cells 24B or the number of series-connected lithium-ion cell groups 24C of which it is to be composed may be so set that the average operating voltage is close to but a bit higher than 12 V while at the same time the above-described voltage conditions for the present invention are satisfied.

In this contemplated case, the operating voltage of the virtual battery 32 is preferably so set as to lie in the range of 9.0 V to 17.0 V.

A 24-V class lead-acid battery, for example, may be used as the lead-acid battery 26A and in this contemplated case, the operating voltage of the virtual battery is preferably so set as to lie in the range of 18.0 V to 34.0 V.

If necessary, a 48-V class lead-acid battery, for example, may be used as the lead-acid battery 26A; alternatively, an entirely new configuration may be designed by connecting any desired number of lead-acid battery cells in series.

In the present invention, a 12-V class lithium-ion battery 24A and a 12-V class lead-acid battery 26A may be connected in parallel to make a virtual battery 32 and four such 12-V class virtual batteries 32 may be connected in series to make the battery 10 of the present invention which is a 48 V-class hybrid storage battery as depicted in FIG. 4.

On the following pages, the battery 10 of the present invention which is a 48-V class hybrid storage battery using the 12-V class lithium-ion battery 24A and the 12-V class lead-acid battery 26A is given as a typical example and described in detail.

In this contemplated case, a lead-acid battery of 12 V and 45 Ah is preferably used as the lead-acid battery 26A; if desired, a product of ACDelco having the specifications of S55B24L, 45 Ah, 430 CCA, 239 L×134 W×201 H (mm), and 12.8 kg may be employed. Note that 12-V class lead-acid batteries are those lead-acid batteries which are most commonly available at lower prices.

To the battery 10 of the present invention, the virtual battery balancer circuits 30A for maintaining the balance between the states of charge of the series-connected virtual batteries 32 to lie within a specified range are connected as the battery management system 19 depicted in FIG. 2. Being circuits for transferring a comparatively small amount of electrical power, the virtual battery balancer circuits 30A are available at a very low cost as compared with the protective circuits and switches which are essential to the conventional lithium-ion batteries.

Because of these virtual battery balancer circuits 30A, the virtual batteries 32 are able to maintain generally constant charging levels among themselves. If desired, the function of the virtual battery balancer circuits 30A may be assigned to the current regulating apparatus 16.

As shown in FIG. 5, the lithium-ion battery 24A consists of lithium-ion cells 24B which are connected in series and in parallel as well to provide a predetermined voltage.

If a 12-V class lithium-ion battery, for example, is to be used as the lithium-ion battery 24A, four lithium-ion cell groups 24C, each of which consists of 24 parallel-connected cylindrical Li-ion cells of so-called 26650 size format each having an outside diameter of 26 mm and a height of 65 mm and which are connected in series, constitute the lithium-ion battery 24A. Since each of the cylindrical lithium-ion cells 24B has the ratings of 3 V and 3 Ah, the lithium-ion battery 24A has the ratings of 12 V and 72 Ah.

Each lithium-ion cell group 24C of the lithium-ion battery 24A that contains 24 parallel-connected cells is furnished with a cell balancer circuit 34 (to be described later) for bringing the state of charge of the series-connected cells to the same level. The cell balancer circuit 34 is essential if the battery is to be used for a prolonged period of time. In order to make the outer shape of the lithium-ion battery 24A comparable to that of the existing lead-acid battery 26A (12 V, 45 Ah), a lithium-ion battery case measuring 239 L×134 W×201 H (mm) (excluding the terminals) is provided and 96 lithium-ion cells 24B, the cell balancer circuits 34, and the terminals are accommodated within this sized case.

The lithium-ion cells 24B in the embodiment under consideration are lithium iron phosphate (LiFePO$_4$) cells which are used in LFPO-type batteries. Lithium iron phosphate batteries are known to be excellent in voltage flatness, structurally excellent in heat stability, as well as to be less expensive and exert smaller impact on the environment than other types of lithium-ion batteries.

As mentioned above, the lithium-ion cells 24B have cell balancer circuits 34 in their interior for adjusting the charging balance between the series-connected cells belonging to different cell groups each consisting of parallel-connected cells; like the virtual battery balancer circuits 30A, the cell balancer circuits 34 maintain the balance between the charging capacities of the series-connected cells to lie within a specified range.

It is important for vehicles such as electric cars that the energy storing device, namely, the storage battery, should be adapted to be lighter in weight. Considering the balance between cost and weight, the lithium-ion batteries 24A desirably account for at least 10% but not higher than 90% of the total capacity. In the virtual batteries described above, the lead-acid batteries 26A have a capacity of 45 Ah whereas the lithium-ion batteries 24A have a capacity of 72 Ah, thus satisfying the above-mentioned requirement of capacity ratio.

As already noted above, common lithium-ion batteries include not only the balancer circuits for bringing the voltage and the state of charge of the respective batteries to the same levels but also protective circuits or switches that are provided as essential components to prevent them from becoming overcharged or overdischarged to suffer any abnormality that might be seriously damaging to the battery life. And such protective circuits or switches are so expensive that they are nearly as costly as the lithium-ion batteries themselves.

However, this is not the case with the virtual batteries 32 of the present invention in which the lithium-ion batteries 24A are connected in parallel to the lead-acid batteries 26A; before the lithium-ion batteries 24A reach the potentially overcharging voltage, the lead-acid batteries 26A reach the final charging voltage and evolve hydrogen gas; since this consumes a certain amount of electrical energy, the likelihood for the lithium-ion batteries 24A to get into an abnormal state due to overcharging is reduced. In other words, the lead-acid batteries 26A serve as protective circuits or switches, so the cost of such protective circuits or switches can be saved to realize a considerable cut on the overall cost of the storage battery. In this connection, voltage/temperature information such as "charging voltage is too high" or "vigorous hydrogen evolution has accordingly occurred in lead-acid batteries to make them hot" is obtained by measurement with the battery management system 19 and transferred as data for recording purposes and for taking a corrective measure (maintenance such as replacement of failing batteries) at a later time.

As also mentioned above, the charger 20, if it is used for lithium iron phosphate batteries, performs constant-voltage charging when they are near at a fully charged state. The charger 20 is preferably so set as to perform constant-voltage charging at 14.0 V to 14.4 V in order to ensure that the lithium-ion batteries 24A will not be overcharged and that no hydrogen gas will evolve from the lead-acid batteries 26A.

This is also the case with charging based on the regenerative energy as from the electromagnetic hydraulic actuator 17a; it is preferably so designed that as long as the lithium-ion battery portion of the hybrid storage battery has a small residual power, constant-current charging is performed but when it is near at a fully charged state, constant-voltage charging is performed at 14.0 V to 14.4 V as in the case of charging by the charger 20.

As already mentioned, the lithium-ion battery portion 24 in the embodiment under consideration is composed of the 12-V class lithium-ion batteries 24A and, as also mentioned before, is connected to the lead-acid battery portion 26 via connectors; the 12-V class lithium-ion battery 24A and the 12-V class lead-acid battery 26A are connected in parallel to make the virtual battery 32 and a plurality of such virtual batteries 32 are connected in series to make the hybrid storage battery 10.

Aside from the aforementioned 12-V class battery configuration, a 24-V class configuration may be adopted by making parallel connection to a 24-V class lead-acid battery; in this case, a 24-V class lithium-ion battery may be constructed in either one of the following ways: a single cell is made using a cathode active material for the 3.6-V class lithium-ion cell (e.g. NMC, NCA, LCO, or LMO) and 7 or 8 such single cells are connected in series; alternatively, a 3-V class single cell is made using lithium iron phosphate as the main cathode active material and 8 or 9 such single cells are connected in series. In both of these cases, a carbon- or silicon-based material is used for negative electrode.

As already mentioned above, the battery chemistry of the hybrid storage battery 10 is such of a combined type that in the early stage of discharging, electrical power is mainly supplied from the lithium-ion batteries 24A and in the later stage of discharging, power is supplied from the lead-acid batteries 26A; since the lithium-ion batteries 24A having superior deep-discharge cycle performance are used earlier, the depth of discharge of the lead-acid batteries 26A with a short deep-discharge cycle life can be maintained at low level.

The term "battery chemistry" relates to the positive electrode active materials, negative electrode active materials, and electrolyte that compose the respective batteries (lithium-ion batteries 24A and lead-acid batteries 26A).

Common electric cars run on batteries having voltage settings of 300-400 V; the battery 10 of the present invention, however, is designed to have voltage settings not higher than 60 V and one of the reasons for this is that they do not want to be subjected to strict regulations such as those that apply to dc power supplies or dc electric circuits operating at more than 60 V; having this low voltage setting, the battery 10 of the present invention may be used on compact or small cars, three-wheelers, and the like.

In general, heavy cars such as trucks and buses use 600-V class and other high-voltage power supplies and passenger cars use 300-V power supplies; in contrast, compact or small cars weighing 500 kg and less preferably use low-voltage power supplies operating at 60 V or lower. The low-voltage power supplies operating at 60 V or lower are less hazardous to the human body, need to meet less strict regulations, and contribute to a reduction in the overall cost of the system. If the vehicle weight increases, the current flowing at low voltage is so large that the system cost will increase rather than decrease.

As shown in FIG. 3, the lithium-ion battery portion 24 is connected to the lead-acid battery portion 26 and the virtual battery balancer circuit portion 30. If desired, the battery (hybrid storage battery) 10 may be so designed that only the lithium-ion battery portion 24 is removable as one cassette module for replacement. Even if the lithium-ion battery portion 24 is removed, the lead-acid battery portion 26 has a sufficient discharge capacity left intact to enable the electric car 100 to travel.

Although not shown in FIG. 3, connectors, manually operated circuit-breaking switches and like devices for facilitating maintenance and other operations are usually provided between the battery (hybrid storage battery) 10 and the charge/discharge voltage/current regulating apparatus (e.g. inverter) 16.

If the hybrid storage battery of FIG. 3 is to be used in a power storage unit to be described later in this specification, the current regulating apparatus (e.g. inverter) 16 is connected not to the drive motor 12 but to a grid to be described later.

At subzero cooler temperatures, the lead-acid batteries 26A predominantly discharge in place of the lithium-ion batteries 24A having considerably poor performance at cooler temperatures but as their internal temperature increases with use, the lithium-ion batteries 24A make greater contribution. In other words, the hybrid storage battery 10 is also improved in performance at cooler temperatures as compared with the lithium-ion batteries 24A.

Thus, the hybrid storage battery 10 does not suffer a shorter cycle life despite the use of the lead-acid batteries 26A and obtains superior performance at cooler temperatures despite the use of the lithium-ion batteries 24A; these and other advantages of the hybrid storage battery 10 contribute to providing a less expensive, high-performance electric car 100.

In the hybrid storage battery 10 of the present invention, a completely sealed battery using an organic solution (flammable) as electrolyte (organic solution based battery), such as lithium-ion battery 24A, and an aqueous solution based battery using an aqueous solution as electrolyte, such as lead-acid battery 26A, are connected in parallel to make a virtual battery; the energy generated during overcharging is consumed by the decomposition reaction of the electrolyte in the aqueous solution based battery, thereby preventing the gushing of flammable gases out of the battery system through the cascade of electrolyte decomposition in the organic solution based battery→increase in internal pressure→activation of safety valve, or preventing abnormality such as heat generation or fires in the battery due to thermal runaway.

Hence, it goes without saying that various relationships between the organic solvent based battery and the aqueous solution based battery that concern various, charge/discharge-associated voltages and the like satisfy various relationships between the lithium-ion battery and the lead-acid battery that concern various, charge/discharge-associated voltages and the like.

Therefore, the organic solution based battery is not limited to the lithium-ion battery and may be any organic solution based battery that uses a less overcharge-resistant inflammable organic solution as electrolyte, and the aqueous solution based battery is not limited to the lead-acid battery and may be any aqueous solution based battery that uses an overcharge-resistant aqueous solution (non-flammable) as electrolyte. Thus, the virtual battery may be composed by connecting Ni—Cd, Ni-MH, etc. rather than the lead-acid battery to the lithium ion battery. In the case of the lead-acid battery, 6 lead-acid battery cells connected in series are connected in parallel to a lithium-ion battery consisting of 4 series-connected lithium iron phosphate battery cells to make a 12-V class virtual battery; in comparison, 3 series-connected Ni—Cd or Ni-MN cells and a single lithium-ion battery cell using a lithium oxide of transition metal for positive electrode may advantageously be connected in parallel to make a 3.6-V class virtual cell.

Described above are basic configurations of the hybrid storage battery of the present invention and the vehicle employing the same.

(Charging/Discharging Voltage Behavior)

We next describe the action of the hybrid storage battery of the present invention.

The hybrid storage battery 10 of the present invention is composed of the 48-V class lithium iron phosphate battery (lithium-ion battery portion 24) and the 48-V lead-acid battery (lead-acid battery portion 26), which display the following charging/discharging voltage profiles as illustrated in FIG. 6. In the case shown in FIG. 6, the 48-V class lithium iron phosphate battery has a capacity of 60 Ah (60 V, C/2 charge, C/3 discharge) and consists of 4 series-connected 12-V class lithium iron phosphate batteries 24A each consisting of 4 series-connected 3.3-V class $LiFePO_4$/carbon cells, whereas the 48-V class lead-acid battery has a capacity of 55 Ah (65.4 V, C/2 charge, C/3 discharge) and consists of 4 series-connected 12-V class lead-acid batteries 26A each consisting of 6 series-connected 2-V class cells.

FIG. 6 is a graph showing the charge/discharge voltage profiles of respective examples of the 48-V class lead-acid battery (SLB: sealed lead-acid battery) and 48-V class lithium iron phosphate battery (LIB: lithium-ion battery) which are used in the hybrid storage battery 10 of the present invention.

If the charger has a voltage setting of 60 V, the lead-acid battery (SLB) is charged as indicated by region A of curve La in the graph of FIG. 6 and the voltage between terminals increases monotonically.

Eventually, the lead-acid battery is fully charged to reach the final charging voltage (=charger's voltage setting=60 V) indicated by region B of curve La in the graph of FIG. 6. In the lead-acid battery, the aqueous solution is even electrolyzed slightly from the start of charging and hydrogen evolves in a small amount; if charging is continued even after the final charging voltage indicated by region B of curve La in the graph of FIG. 6 has been reached, electrolysis of the aqueous solution becomes predominant and hydrogen evolution (gassing) consumes the charging energy to suppress a further increase in the charging voltage between terminals; hence, the final charging voltage can also be referred to as the hydrogen evolution voltage. Thus, the lead-acid battery may be described as having high resistance to overcharging but it should of course be noted that if the charging that causes vigorous hydrogen evolution is continued, the lead-acid battery will be overcharged to deteriorate until it is no longer usable.

If the charging of the lead-acid battery is stopped after it reached the final charging voltage indicated by region B of curve La in the graph of FIG. 6, the electrolyte temperature or other factor drops or otherwise changes, whereupon the voltage between terminals will immediately drop from the final charging voltage (60 V) and, in the illustrated case, settles at about 54 V.

Thereafter, the lead-acid battery (SLB) discharges as indicated by region C of curve La in the graph of FIG. 6 and its voltage between terminals gradually decreases until it reaches a final discharging voltage, for example, 40 V at the end of region C (toward the right end of FIG. 6). As already mentioned, the average value of the discharging voltage the lead-acid battery has in this region C is called the average discharging voltage (for example, 48 V).

If the lead-acid battery is further discharged beyond this final discharging voltage, the voltage between terminals will suddenly drop and the lead-acid battery becomes overdischarged, whereupon both positive and negative electrodes will deteriorate to degrade the lead-acid battery itself which becomes no longer usable. In other words, the lead-acid battery may well be described as having low resistance to overdischarging.

The lithium iron phosphate battery (LIB), on the other hand, is charged as indicated by region D of curve Lb in the graph of FIG. 6; in the early stage of charging, the voltage between terminals increases gradually and as it is becoming fully charged toward the end of charging, the charging voltage increases abruptly and a fully charged state is reached. In the illustrated case, the charger is assumed to have a voltage setting of 60 V, so the peak voltage at the boundary between regions D and E of curve Lb in the graph of FIG. 6 temporarily assumes the value 60 V at which the lithium-ion battery (LIB) becomes overcharged; if the charging is stopped, the voltage drops a little and settles at the final charging voltage (for example, 58 V).

Then, the lithium-ion battery discharges as indicated by region E of curve Lb in the graph of FIG. 6 and in the very early period of discharging from the final charging voltage, the voltage between terminals suddenly drops to a specified level, somewhere between 52 V and 53 V in the illustrated case and thereafter the discharging is continued with the voltage between terminals kept at a substantially constant level. If the lithium-ion battery is further discharged, the voltage between terminals eventually begins to drop until it reaches the final discharging voltage, for example 44V, at the end of region E (toward the right end of FIG. 6). As already mentioned, the average value of the discharging voltage the lithium-ion battery has in this region E is called the average discharging voltage (for example, 52 V).

If the lithium-ion battery is further discharged beyond this final discharging voltage, the voltage between terminals will suddenly drop and the lithium-ion battery becomes overdischarged. Even if it becomes overdischarged, the lithium-ion battery can be further charged until a fully charged state is reached, so it may well be described as having high resistance to overdischarging.

As described above, the hybrid storage battery of the present invention comprising the lead-acid battery and the lithium-ion battery connected in parallel is characterized in that when the voltages of the lead-acid battery and the lithium-ion battery become generally equal to each other in the early stage of charging (see regions A and D of curves La and Lb, respectively, in the graph of FIG. 6), charging of the lithium-ion battery predominates (region D of curve Lb in the graph of FIG. 6). Even if the lithium-ion battery reaches the fully charged state and the voltage increases, the lead-acid battery prevents a further increase in voltage, so the lithium-ion battery will never become abnormal on account of overdischarging (see regions B and D of curves La and Lb, respectively, in the graph of FIG. 6).

In the early stage of discharging (region E of curve Lb in the graph of FIG. 6), the discharging of the lithium-ion battery predominates and in the middle stage of discharging onward, discharging is effected from both the lithium-ion battery and the lead-acid battery (regions E and C of curves Lb and La, respectively, in the graph of FIG. 6).

Table 1 below shows the charging/discharging characteristics of the lead-acid battery and lithium-ion battery based on the graph of FIG. 6 which depicts the charging/discharging voltage profiles of the hybrid storage battery 10 of the present invention.

Table 1: Charging/Discharging Voltage Characteristics for the Case of Constructing a 48-V Class Hybrid Storage Battery Using the Lead-Acid Battery and the Lithium Iron Phosphate Battery

TABLE 1

| | | |
|---|---|---|
| 1 | Lithium iron phosphate battery, potentially overcharging voltage | 70.4 V |
| 2 | Lead-acid battery, final charging voltage (=full charging voltage = charger's voltage setting) | 60.0 V |
| 3 | Lithium iron phosphate battery, final charging voltage (=complete charging voltage) | 58.0 V |
| 4 | Lithium iron phosphate battery, average discharging voltage | 52.0 V |
| 5 | Lead-acid battery, average discharging voltage | 48.0 V |
| 6 | Lithium iron phosphate battery, final discharging voltage | 44.0 V |
| 7 | Lead-acid battery, final discharging voltage | 40.0 V |

Consider first the case where the charging voltage of the hybrid storage battery 10 of the present invention increases; since the final charging voltage of the lead-acid battery portion 26 (see item 2 of Table 1) is lower than the potentially overcharging voltage of the lithium-ion battery portion 24 (see item 1), hydrogen gas evolves in the lead-acid battery portion 26 before the lithium-ion battery portion 24 reaches the potentially overcharging voltage; since this consumes electric energy, there will be no further increase in the charging voltage on the hybrid storage battery 10, hence, the lithium-ion battery portion 24.

Consider further the case of charging the hybrid storage battery of the present invention; since the final charging voltage of the lithium-ion battery portion 24 (see item 3 of Table 1) is lower than the final charging voltage of the lead-acid battery portion 26 (see item 2), the lithium-ion battery portion 24 having a coulombic efficiency of 100% (coulombic efficiency indicating the amount of electricity removed during discharging as compared with the amount of electricity used during charging) is the first to be charged, so the recovery efficiency of electrical power can be increased without recovery loss that might occur on account of electrolyte decomposition in the lead-acid battery portion 26.

As already mentioned above, the lead-acid battery generally has low resistance to overdischarging and, unlike the lithium-ion battery, its cycle life deteriorates considerably if it is completely discharged, even overdischarged; it is therefore preferred that even when the lithium-ion battery portion 24 reaches the final discharging voltage, the lead-acid battery portion 26 does not reach its own final discharging voltage and this is important from the viewpoint of protecting the lead-acid battery.

In the hybrid storage battery 10 of the present invention, the final discharging voltage of the lithium-ion battery portion 24 (see item 6 of Table 1) is higher than the final discharging voltage of the lead-acid battery portion 26 (see item 7), so in the early stage of discharging, the lithium-ion battery portion 24 is mainly discharged and in the middle to the later stage of discharging, both the lead-acid battery portion 26 and the lithium-ion battery portion 24 are discharged. If, however, intense pulse discharging is effected (as when an electric car is rapidly accelerated or when a power storage unit uses a momentarily increased amount of current), the charging current will mainly flow out of the lead-acid battery portion 26. In a case like this, if the voltage between terminals of each lead-acid battery 26A in the lead-acid battery portion 26 drops below the voltage between terminals of each lithium-ion battery 24A in the lithium-ion battery portion 24, the lead-acid batteries 26A in the lead-acid battery portion 26 will be charged by the lithium-ion batteries 24A in the lithium-ion battery portion 24. Thus, in principle, the depth of discharge from each lead-acid battery 26A in the lead-acid battery portion 26 is kept small enough to extend its cycle life.

Comparative Experiment 1

Batteries of the configurations shown in FIGS. 7(A) to 7(D) were installed on vehicles and Comparative Experiment 1 was conducted to compare the performance of the hybrid storage battery of the present invention with that of conventional batteries. The performance data for lithium-ion batteries 24A and lead-acid batteries 26A composing the configurations shown in FIGS. 7(A) to 7(D) are given in Table 2 below.

Table 2: Performance of Lithium-Ion Battery and Lead-Acid Battery

TABLE 2

|  | Capacity | Amount of effective electricity | Power |
|---|---|---|---|
| 12-V class lithium iron phosphate battery 24A | 72 Ah | 0.9 kWh | 1.8 kW |
| 12-V class lead-acid battery 26A | 55 Ah | 0.4 kWh | 4.3 kW |

Figure 7:
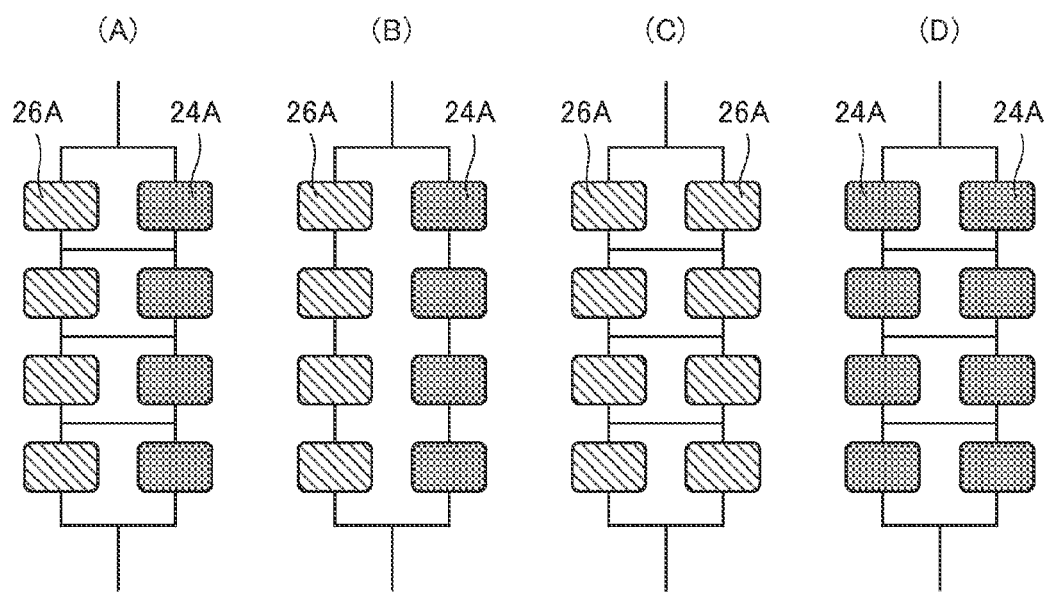
FIG. 7 (A) is a schematic diagram showing the main portion of the hybrid storage battery shown in FIG. 4; (B) is a schematic diagram showing the configuration of the conventional hybrid storage battery; (C) is a schematic diagram showing the configuration of the conventional lead-acid battery; and (D) is a schematic diagram showing the configuration of the conventional lithium-ion battery.

Configuration A shown in FIG. 7(A) was the 48-V class hybrid storage battery 10 of the present invention that consisted of 4 series-connected virtual batteries 32, each consisting of the aforementioned lead-acid battery 26A (12-V class, 55 Ah, outside dimensions of ca. 254×174×169 mm, weighing ca. 20 kg) and the also aforementioned lithium-ion battery 24A (cylindrical LiFePO$_4$/graphite cells of 26650 size format connected in 4S-24P and packed in a box with the same outside dimensions of ca. 254×174×169 mm as the lead-acid battery; weighing ca. 12 kg); configuration B shown in FIG. 7(B) was a conventional hybrid storage battery consisting of two parallel-connected 48-V class batteries, one consisting of four series-connected lead-acid batteries 26A described above and the other consisting of four series-connected lithium-ion batteries 24A also described above; configuration C shown in FIG. 7(C) was a 48-V class storage battery consisting of four series-connected battery rows each consisting only of the aforementioned lead-acid batteries 26A; and configuration D shown in FIG. 7(D) was a 48-V class storage battery consisting of four series-connected battery rows each consisting only of the aforementioned lithium-ion batteries 24A.

FIGS. 7(A) to 7(D) do not show balancer circuits for maintaining the balance between the charging capacities of the individual batteries in a specified range, but it goes without saying that those configurations have balancer circuits for adjusting the balance between the charging capacities of individual series-connected cells, individual series-connected batteries, or of individual series-connected virtual batteries.

Storage batteries of configurations A to D as shown in FIGS. 7(A) to 7(D) were installed on electric cars (compact three-wheelers); actual running of the cars gave the results shown in Table 3 below.

Table 3: Performance of the Inventive Hybrid Storage Battery as Compared with Conventional Storage Batteries

TABLE 3

|  | Traveling distance | Acceleration | Regenerative power's recovery efficiency | Life | Cost |
|---|---|---|---|---|---|
| Electric car using the inventive hybrid storage battery of configuration A | 60 km | good | 70% | long | appropriate |
| Electric car using conventional hybrid storage battery of configuration B | 60 km | good | 60% | short | appropriate |
| Electric car using conventional storage battery of configuration C | 38 km | good | 40% | very short | comparatively low |
| Electric car using conventional storage battery of configuration D | 86 km | poor | 70% | long | very high |

As Table 3 shows, in comparison with the conventional storage batteries of configurations B to D, the hybrid storage battery of the present invention having configuration A displayed well-balanced performance in all aspects evaluated, i.e., distance traveled by the vehicle, acceleration, regenerative power's recovery efficiency, life, and cost; it may well be concluded that the inventive hybrid storage battery has the best overall quality.

The advantageous results shown in Table 3 above that were achieved by the hybrid storage battery of the present invention having configuration A may be described as follows: in terms of travelling distance, the characteristics of lithium-ion battery 24A having high energy density were effectively used; in terms of acceleration, the characteristics of lead-acid battery 26A having small internal resistance were effectively used; in terms of regenerative power's recovery efficiency, the characteristics of lithium-ion battery 24A were effectively used; in terms of life, the making of virtual battery 32 by connecting lithium-ion battery 24A and lead-acid battery 26A in parallel contributed to extending the cycle life of lead-acid battery 26A; and in terms of cost, the use of lead-acid battery 26A contributed to eliminating protective circuits.

Comparative Experiment 2

To further demonstrate the cost-effectiveness of the present invention, Comparative Experiment 2 was conducted, in which the hybrid storage battery 10 of the present invention as installed on a 10-ton class hybrid truck of plug-in range extender type using the battery/engine combination was compared with a lithium-ion battery that was solely installed on the same hybrid truck.

The battery performance required for this application is an output power of at least 230 kW and an energy of at least 10 kW (the higher, the better) on a power supply no heavier than 500 kg.

To make the hybrid storage battery, a sealed lead-acid battery manufactured by GS YUASA (model name: RE 12-12; 12 V, 12 Ah, size of 151×98×98 mm; 2.7 kg) was used as the lead-acid battery, and lithium-ion cells of 22650 size format manufactured by A123 (model name: ANR 26650 M1-B; 3.3 V, 2.4 Ah, 76 g) were connected in 4S and 4P and placed in a box of the same outside dimensions as RE 12-12 to make a lithium-ion battery pack of 12 V-9.6 Ah and use it for the hybrid storage battery.

Three units of the lead-acid battery were connected in parallel to one unit of the lithium-ion battery as above to form a virtual battery. Forty-eight units of such virtual battery were connected in series to form a hybrid storage battery according to the present invention which was designated HYB-1. In a separate step, two units of the above lithium-ion battery were connected in parallel to one unit of the lead-acid battery to form a virtual battery. Forty-eight units of such virtual battery were connected in series to form another hybrid storage battery according to the present invention which was designated HYB-2. Without using the lead-acid battery, the above lithium-ion cells were connected in 192S and 6P to form a lithium-ion battery for comparative purposes which was designated LIB.

The performance and cost as compared between the respective batteries are shown in Table 4 below.

TABLE 4

Cost advantage of the hybrid storage battery

| | Hybrid storage battery HYB-1 | Hybrid storage battery HYB-2 | Conventional lithium-ion battery LIB | Unit |
|---|---|---|---|---|
| Proportion of lead-acid battery in the entire battery (energy ratio) | 59% | 20% | 0% | % |
| Energy | 16 | 16 | 19 | kWh |
| Electrical power | 406 | 294 | 274 | kW |
| Weight | 485 | 322 | 175 | kg |
| Cell price | 5,386 | 8,888 | 12,766 | yen |

TABLE 4-continued

Cost advantage of the hybrid storage battery

| | Hybrid storage battery HYB-1 | Hybrid storage battery HYB-2 | Conventional lithium-ion battery LIB | Unit |
|---|---|---|---|---|
| Costs of balancer circuits, protective circuits, and protective switches | 1,616 | 2,729 | 6,383 | yen |
| Sum of cell price and costs of balancer circuits/protective circuits/protective switches | 7,002 | 11,617 | 19,149 | yen |
| Price per energy | 446 | 734 | 1,004 | yen/kWh |
| Price per electrical power | 17 | 39 | 70 | yen/kW |

As is clear from Table 4, the hybrid storage battery of the present invention becomes less expensive as it uses an increasing proportion of the lead-acid battery. Another advantage of increasing the proportion of the lead-acid battery is improved power performance at cooler temperatures. There is a tradeoff, however, and that is an increased battery weight. In the Example under consideration, both HYB-1 and HYB-2 satisfy the performance requirements but HYB-2 having good balance between cost reduction and weight gain may well be described as the most practically feasible hybrid storage battery.

HYB-1 is the least expensive but it is as heavy as 485 kg. In addition, the energy of the lithium-ion battery is only 41% (=100%−59%) of the total energy, which amounts to 16 kWh×0.49=6.6 kWh; to satisfy the required performance of 10 kWh, the lead-acid battery need be deeply discharged in each cycle but this may potentially shorten the cycle life of the battery.

In contrast, the energy of the lithium-ion battery in HYB-2 is 80% (=100%−20%) of the total energy, which amounts to 18×0.8=14.4 kWh, an amount well beyond the required amount of 10 kWh, so in regular discharge, the lithium-ion battery mainly discharges, allowing the lead-acid battery to be discharged only shallowly. Consequently, the battery's cycle life can be extended.

The conventional LIB is the least heavy and has a long enough cycle life; on the other hand, it lacks the safety feature which would otherwise be obtained by using it in parallel connection with the lead-acid battery; to deal with this problem, quite expensive protective circuits and switches must be used but this simply causes the disadvantage of increasing the overall cost. Additionally, in the absence of the lead-acid battery which has good performance at cooler temperatures, use in the winter season may potentially pose a problem. For these reasons, HYB-2 may well be described as the best hybrid storage battery.

As set out above, the hybrid storage battery of the present invention will offer marked effects in terms of economy and performance at cooler temperatures if it is so configured that the lead-acid battery delivers energy in amounts of at least 20% but not more than 60% of the energy delivered from the entire storage battery.

(Power Storage Unit, Smart Grid Vehicle System, and Power Supply Network System)

Figure 8:
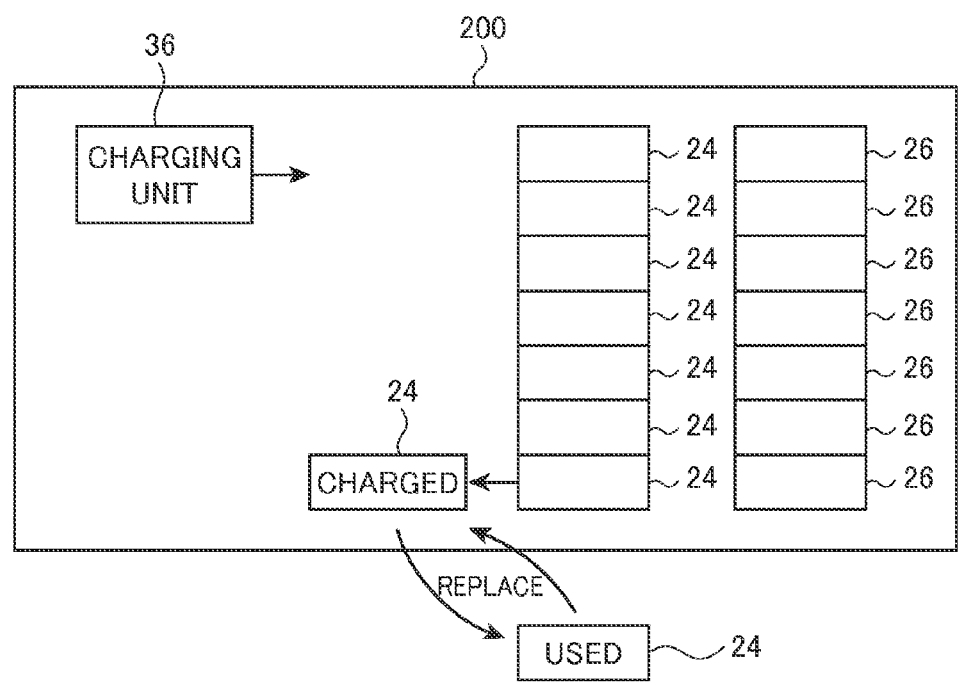
FIG. 8 is a schematic diagram showing a structural outline of an embodiment of the power storage unit according to the present invention.
Figure 9:
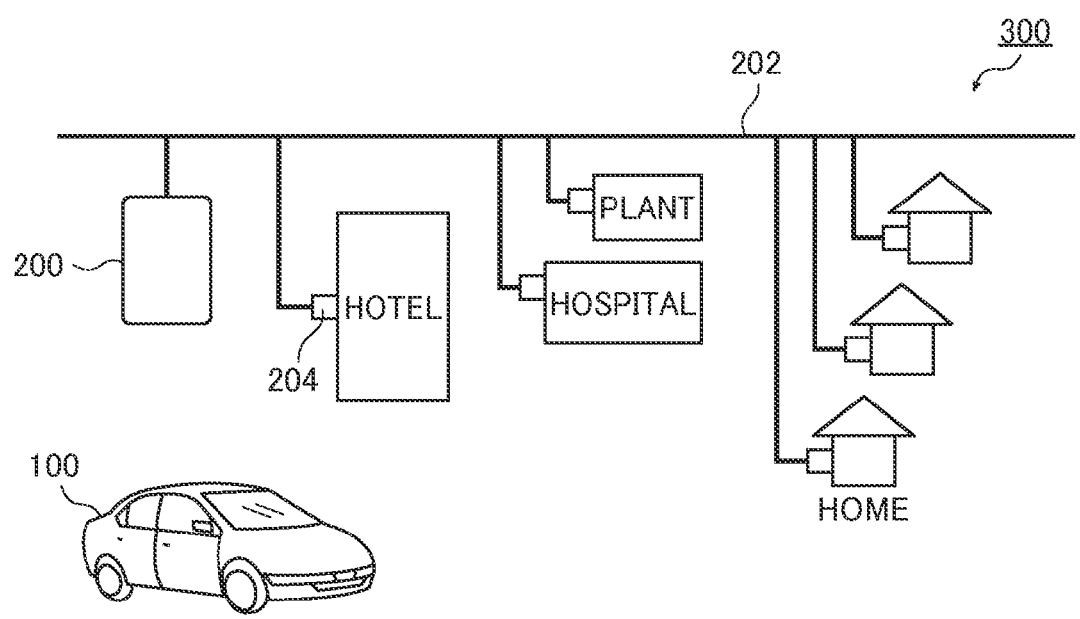
FIG. 9 is a schematic diagram showing a structural outline of an embodiment of a smart grid system employing the power storage unit according to the present invention.

Referring to FIGS. 8 and 9, we next describe a power storage unit 200, a smart grid vehicle system, and a power supply network system 300; the power storage unit 200 is a battery replacing/charging unit, or a unit that stores the lithium-ion battery portion (cassette module) 24 of the hybrid storage battery 10 of the present invention and which replaces/charges a cassette module of the discharged lithium-ion battery portion 24 in the vehicle (electric car) 100 of the present invention and/or a power supply unit that has many units of the hybrid storage battery 10 of the present invention built in it and which supplies facilities such as plants, shops, hotels, hospitals and individual residences (homes) with electrical power in the case of emergency such as power failure; the smart grid vehicle system includes the vehicle (electric car) 100 and power storage unit 200 of the present invention; the power supply network system 300 includes the smart grid vehicle system as well as a power supply command means 204 for supplying electrical power from the power storage unit 200 to each of the above-mentioned facilities in case of emergency such as power failure.

As shown in FIG. 8, the power storage unit 200 has a charging unit 36 and a plurality of hybrid storage batteries (also referred to simply as batteries) 10, that is to say, a plurality of lithium-ion battery portions 24 and a plurality of lead-acid battery portions 26.

The batteries 10 to be stored in the power storage unit 200 shown in FIG. 8 may be in any of the forms of hybrid storage battery described above but it preferably includes a replaceable lithium-ion battery portion (cassette module) 24. If desired, part or all of the batteries 10 to be stored in the interior of the power storage unit 200 may be substituted with replaceable cassette modules 24 of lithium-ion battery portion. In the illustrated case, the power storage unit 200 includes a plurality of batteries 10 but the present invention is not limited to this particular embodiment and the power storage unit 200 may be used as a battery replacing/charging unit for replacing the cassette modules 24 of the lithium-ion battery portion of the battery 10 installed on the electric car 100; in this case, in order to ensure that the cassette modules 24 each consisting of expensive lithium-ion batteries are charged as quickly as possible to allow for their efficient use, the number of such cassette modules may be reduced, and the power storage unit 200 may be so designed that it is mainly composed of the same type of lead-acid batteries as the lead-acid battery portion of the battery 10. In the latter case, the power storage unit 200 may include at least one cassette module 24, namely, one battery 10.

The charging unit 36 is connected to a power supply such as ac 100-V or 200-V within the power storage unit 200 for charging the hybrid storage battery 10 of the present invention by a predetermined charging method under predetermined conditions; it may be of a type that directly charges the battery 10 as installed on the electric car 100 or the battery 10 as built in the power storage unit 200; alternatively, it may be of a type that charges the cassette module 24 of the lithium-ion battery portion as removed from the battery 10 installed on the electric car 100. In the case where it is used for directly charging the battery 10 installed on the electric car 100, the charging unit 36 may be so designed that charging is effected via the in-vehicle charger 20 on the electric car 100. Alternatively, the lead-acid battery portion 26 preliminarily connected to the charging unit 36 may then be connected to the cassette module 24 of the lithium-ion battery portion to make the battery 10, thus enabling the charging of the cassette module 24.

The charging unit 36 may be of any type that has the same function as the in-vehicle charger 20 on the electric car 100 and which is capable of charging the battery 10, provided that it preferably has a quick charging capability, or the ability to charge the battery 10 at a faster rate than the in-vehicle charger 20 on the electric car 100.

Needless to say, the power storage unit 200 may have a capability of providing a power source for charging the battery 10 on the electric car 100 by means of the in-vehicle charger 20; alternatively, it may have a charger of the same type as the in-vehicle charger 20.

By using the hybrid storage battery 10 of the present invention in the power storage unit 200, protective circuits and switches can be eliminated, contributing to cost reduction. In addition, the individual lead-acid batteries 26A in the lead-acid battery portion 26 which considerably deteriorate in cycle performance upon deep discharging are caused to discharge later than the lithium-ion batteries 24A in the lithium-ion battery portion 24, so it often suffices that the lead-acid batteries 26A are discharged comparatively shallowly. Consequently, the use of the lead-acid batteries 26A will in no way affect the cycle life of the overall system.

Thus, as in the aforementioned electric car 100, the hybrid storage battery 10 having various advantages, including protection against deterioration in cycle life despite the use of the lead-acid battery 26A and the display of good performance at cooler temperatures despite the use of the lithium-ion battery 24A, can provide the power storage unit 200 that is cost-effective and features high performance.

It should be noted here that for the power storage unit 200 of a stationary type which may also be used as a power supply unit, weight is not a very important factor but cycle life is an extremely important factor. Hence, considering cost and cycle life, it is recommended that the lithium-ion battery portion 24 having superior cycle life be used to occupy at least 10% but no more than 90% of the total capacity. As already mentioned before, the power storage unit 200 using this hybrid storage battery 10 may be so adapted that part of the lithium-ion battery portions 24 can be taken out one by one, thus making it possible to put the power storage unit 200 to other applications such as the electric car 100. If the power storage unit 200 is to be used with the electric car 100, lightweightness is an important factor, so as already noted before, it is desirable that the lithium-ion battery portions 24 are designed as cassette modules that can be taken out one by one.

As mentioned above, the discharged lithium-ion battery portion 24 of the hybrid storage battery 10 in the electric car 100 can be removed as a single unitary cassette module from the hybrid storage battery 10 for replacement/charging in an external power storage unit 200 such as a battery replacement unit.

A user of the electric car 100 may replace a cassette module of the discharged lithium-ion battery portion 24 (which hence need be replaced) with a cassette module of other lithium-ion battery portion 24 that has been fully charged in the power storage unit 200, thereby saving the time required to recharge the discharged lithium-ion battery portion 24. If surplus power generated at night is used to charge a plurality of such lithium-ion batteries 24A, the charging cost can be reduced. Since the maintenance cost of the battery 10 itself can also be reduced, the user benefits from the advantage of reducing the total battery cost.

Rather than purchasing one lithium-ion battery portion 24 and continuing to use it on the electric car 100, a company operating the power storage unit 200, a car company or the like may rent the lithium-ion battery portion 24 assuming that it will be replaced in the power storage unit 200; if this business style is adopted, the user has no need to purchase an expensive lithium-ion battery unit (cassette module) and the sales price of an electric car 100 using the hybrid storage battery 10 of the present invention can be considerably reduced. If the current high sales price of electric cars can be reduced considerably, their use will spread at an accelerating rate and companies operating power storage units or car companies can consequently benefit from an adequate scale merit based on the spread of electric cars and power storage units.

If the power storage unit 200 is connected to a grid, it can be used as a power supply unit for the purposes of power leveling and power storage (emergency power supply) in the regional area of interest. In addition, by sharing with the electric car 100 (running object) and the hybrid storage battery 10, the power storage unit 200 can be used as part of a smart grid system exemplified by the smart grid vehicle system and the power supply network system 300 depicted in FIG. 9. The grid as used herein generally means a power supply network.

As shown in FIG. 9, the smart grid vehicle system of the present invention may be composed of the electric car 100 and the power storage unit (for example, 100-kWh to 3000-kWh class electrical storage unit) 200. As also shown in FIG. 9, the power supply network system 300, including the above-described smart grid vehicle system composed of the electric car 100 and the power storage unit 200, a power supply network (grid) 202, and power supply command means 204, can be designed either as the smart grid vehicle system of the present invention or as a power supply network system. If the power supply network system 300 of the present invention is designed for the purpose of providing a power source in case emergency such as power failure, the electric car 100 may be eliminated, and the power storage unit 200 need not have a function as a battery replacing/charging unit if it has a capability as a power supply unit.

The power supply command means 204 is installed in facilities such as hospitals, offices, plants, buildings, and houses (residences) to which electrical power is supplied over the power supply network 202 and in case of power failure, the power supply command means 204 sends a power supply command over the power supply network 202 to the power storage unit 200 being used as an emergency power supply.

The power storage unit 200 supplies power over the power supply network 202 to the houses, buildings, plants, etc. from which the unit 200 has received the power supply command through their respective power supply command means 204. The power supply command means 204 can also control and manage the supply of power over the power supply network 202 (to determine whether power should be supplied (ON) or should not be supplied (OFF)), as well as control and manage the quantity of power being supplied over the power supply network 202.

Unlike the conventional emergency power supplies that are installed on the premises of houses, in the basement of buildings, in some part of plants or elsewhere and which are individually subjected to management and maintenance, the power supply network system 300 of the present invention allows for centralized management, thus reducing the costs of providing battery units in premises and their maintenance and inspection.

Described hereinabove are the power storage unit 200 employing the hybrid storage battery 10 of the present invention, the smart grid vehicle system employing the power storage unit 200 of the present invention, and the power supply network system 300.

It should be noted here that if the electric car 100 employing the hybrid storage battery 10 and the power storage unit 200 are components of the smart grid vehicle system, the power storage unit 200 need not have a function as a power supply unit if it has a capability as a battery replacing/charging unit. In this case, the power storage unit 200 may have only the capability as a battery replacement unit or it may have only the capability as a battery charging unit.

As described in detail on the foregoing pages, the hybrid storage battery 10 of the present invention, the electric car (vehicle) 100 employing the same, the power storage unit 200 employing the same, as well as the power supply network system (smart grid vehicle system) 300 employing the power storage unit 200 are basically composed in the ways described hereinabove.

The description of the foregoing embodiments is directed to the case where the hybrid storage battery 10 of the present invention is used with the electric car 100 but it may of course be used in a similar manner with hybrid cars equipped with a gasoline engine or the like; thus, the present invention is by no means limited to the foregoing embodiments and various improvements and modifications are possible without departing from the scope and spirit of the present invention.

REFERENCE SIGNS LIST

10 hybrid storage battery (battery)
12 drive motor
14 reduction gear
16 current regulating apparatus (inverter)
17 braking apparatus
17a electromagnetic hydraulic actuator
17b friction brake
18 battery controller
19 battery management system
20 charger (in-vehicle charger)
22 electric power steering mechanism
24 lithium-ion battery portion (cassette module)
24A lithium-ion battery
24B lithium-ion cell
26 lead-acid battery portion
26A lead-acid battery
30 virtual battery balancer circuit
32 virtual battery
34 cell balancer circuit
36 charging unit
100 electric car (vehicle)
200 power storage unit (battery replacement unit)
202 power supply network (grid)
204 power supply command means
300 power supply network system

The invention claimed is:

1. A hybrid storage battery comprising a plurality of virtual batteries connected in series to each other and each virtual battery comprising an organic solution based battery using an organic solution as electrolyte that is connected in parallel to an aqueous solution based battery using a aqueous electrolyte as electrolyte, wherein:

the organic solution based battery and the aqueous solution based battery of each virtual battery have average discharging voltages approximate to each other, and are so designed that a potentially overcharging voltage of the organic solution based battery is higher than a final charging voltage of the aqueous solution based battery and a final charging voltage of the organic solution based battery is lower than the final charging voltage of the aqueous solution based battery;

the organic solution based battery of each virtual battery becomes overcharged if it is charged beyond its final charging voltage, and gets into a dangerous state if it is charged beyond its potentially overcharging voltage, and the aqueous solution based battery of each virtual battery becomes overcharged if it is charged beyond its final charging voltage; and when each of the plurality of virtual batteries is supplied with sufficient overcharging energy to get the organic solution based battery to become overcharged, the aqueous solution based battery carries out a hydrogen evolving reaction to absorb the overcharging energy so that a charging voltage of the virtual battery is suppressed to the final charging voltage of the aqueous solution based battery, thereby preventing the organic solution based battery from reaching its potentially overcharging voltage, and wherein the organic solution based battery and the aqueous solution based battery are so designed that the average discharging voltage of the organic solution based battery lies between the final charging voltage of the aqueous solution based battery and the average discharging voltage of the aqueous solution based battery.

2. The hybrid storage battery according to claim 1, wherein the organic solution based battery and the aqueous solution based battery are so designed that the final discharging voltage of the organic solution based battery is higher than the final discharging voltage of the aqueous solution based battery.

3. A vehicle equipped with the hybrid storage battery according to claim 1 as a driving energy source.

4. The vehicle according to claim 3, which recovers surplus energy during travel as regenerative electric power and uses it for charging the hybrid storage battery.

5. A smart grid vehicle system, comprising:
the vehicle according to claim 3; and
a power storage equipment including one or more cassette modules of the organic solution based batteries or lithium-ion batteries as charged and stored, and a charger adapted to recharge a cassette module of the organic solution based batteries or lithium-ion batteries that has discharged and is in need of replacement,
wherein each organic solution based battery or each lithium-ion battery is contained in each virtual battery of the plurality of virtual batteries connected in series to each other, and
wherein the organic solution based batteries or lithium-ion batteries are connected in series to each other.

6. The smart grid vehicle system according to claim 5, wherein the power storage equipment includes a replacing structure adapted to replace the cassette module of the organic solution based batteries or lithium-ion batteries that has discharged and is in need of replacement and that is mounted on the vehicle by the cassette module of the organic solution based batteries or lithium-ion batteries as charged and stored.

7. A power storage equipment, comprising:
one or more hybrid storage batteries which are stored inside and are the hybrid storage battery according to claim 1;
a charger adapted to recharge the hybrid storage battery, or a cassette module of the organic solution based batteries or lithium-ion batteries that has discharged,
wherein the hybrid storage battery, or the cassette module of the organic solution based batteries or lithium-ion batteries as charged can be substituted for the hybrid storage battery, or the cassette module of the organic solution based batteries or lithium-ion batteries that has discharged and is in need of replacement,
wherein each organic solution based battery or each lithium-ion battery is contained in each virtual battery of the plurality of virtual batteries connected in series to each other, and
wherein the organic solution based batteries or lithium-ion batteries are connected in series to each other.

8. The power storage equipment according to claim 7, further comprising a cassette module of the organic solution based batteries or lithium-ion batteries as charged which is stored inside.

9. A hybrid storage battery comprising a plurality of virtual batteries connected in series to each other and each virtual battery comprising a lithium-ion battery connected in parallel to a lead-acid battery, wherein:
the lithium-ion battery and the lead-acid battery of each virtual battery have average discharging voltages approximate to each other, and are so designed that a potentially overcharging voltage of the lithium-ion battery is higher than a final charging voltage of the lead-acid battery and a final charging voltage of the lithium-ion battery is lower than the final charging voltage of the lead-acid battery;
the lithium-ion battery of each virtual battery becomes overcharged if it is charged beyond its final charging voltage, and gets into a dangerous state if it is charged beyond its potentially overcharging voltage, and the lead-acid battery of each virtual battery becomes overcharged if it is charged beyond its final charging voltage; and when each of the plurality of virtual batteries is supplied with sufficient overcharging energy to get the lithium-ion battery to become overcharged, the lead-acid battery carries out a hydrogen evolving reaction to absorb the overcharging energy so that a charging voltage of the virtual battery is suppressed to the final charging voltage of the lead-acid battery, thereby preventing the lithium-ion battery from reaching its potentially overcharging voltage, wherein the lithium-ion battery and the lead-acid battery are so designed that the average discharging voltage of the lithium-ion battery lies between the final charging voltage of the lead-acid battery and the average discharging voltage of the lead-acid battery.

10. The hybrid storage battery according to claim 9, wherein the lithium-ion battery and the lead-acid battery are so designed that the final discharging voltage of the lithium-ion battery is higher than the final discharging voltage of the lead-acid battery.

11. The hybrid storage battery according to claim 9, wherein the lithium-ion battery is a lithium iron phosphate battery that uses lithium iron phosphate as a cathode active material.

12. The hybrid storage battery according to claim 9, which includes a virtual battery balancer circuit adapted to adjust a state of charge of the plurality of virtual batteries connected in series to each other in a balanced manner, the virtual battery balancer circuit being provided for each virtual battery.

13. The hybrid storage battery according to claim 9, wherein:
the lithium-ion battery comprises a plurality of series-connected lithium-ion cells or comprises a plurality of series-connected first cell groups each comprising a plurality of parallel-connected lithium-ion cells; and
the hybrid storage battery further includes a first cell balancer circuit adapted to bring a state of charge of the plurality of series-connected lithium-ion cells or the plurality of series-connected first cell groups to a same level.

14. The hybrid storage battery according to claim 9 wherein:
the lead-acid battery comprises a plurality of series-connected lead-acid battery cells or comprises a plurality of series-connected second cell groups each comprising a plurality of parallel-connected lead-acid battery cells; and
the hybrid storage battery further includes a second cell balancer circuit adapted to bring a state of charge of the plurality of series-connected lead-acid battery cells or the plurality of series-connected second cell groups to a same level.

15. The hybrid storage battery according to claim 9, wherein the plurality of virtual batteries have an operating voltage in a range of 9.0 V to 17.0 V.

16. The hybrid storage battery according to claim 9, wherein the plurality of virtual batteries have an operating voltage in a range of 18.0 V to 34.0 V.

17. The hybrid storage battery according to claim 9, which has an operating voltage no more than 60 V.

18. The hybrid storage battery according to claim 9, wherein energy supply from the hybrid storage battery is performed mainly from the lithium-ion battery in an early stage of discharging from a fully charged state, and performed from the lead-acid battery in a later stage of discharging from the fully charged state.

19. The hybrid storage battery according to claim 9, wherein a plurality of lithium-ion batteries connected in series to each other are in a form of a cassette module being detachable and replaceable, each lithium-ion battery being contained in each virtual battery of the plurality of virtual batteries connected in series to each other.

20. A power storage equipment, comprising:
one or more hybrid storage batteries which are stored inside, each hybrid storage battery comprising a plurality of virtual batteries connected in series to each other and each virtual battery comprising an organic solution based battery using an organic solution as electrolyte that is connected in parallel to an aqueous solution based battery using a aqueous electrolyte as electrolyte;
a cassette module of the organic solution based batteries or lithium-ion batteries as charged which is stored inside; and
a charger adapted to recharge a cassette module of the organic solution based batteries or lithium-ion batteries that has discharged,
wherein each organic solution based battery or each lithium-ion battery is contained in each virtual battery of the plurality of virtual batteries connected in series to each other,
wherein the organic solution based batteries or lithium-ion batteries are connected in series to each other,
wherein the cassette module of the organic solution based batteries or lithium-ion batteries as charged can be substituted for the cassette module of the organic solution based batteries or lithium-ion batteries that has discharged and is in need of replacement,
wherein the power storage equipment is connected to a power supply network connecting a plurality of facilities to be supplied with electrical power, and is used for power leveling and power storage, and
wherein:
the organic solution based battery and the aqueous solution based battery of each virtual battery have average discharging voltages approximate to each other, and are so designed that a potentially overcharging voltage of the organic solution based battery is higher than a final charging voltage of the aqueous solution based battery and a final charging voltage of the organic solution based battery is lower than the final charging voltage of the aqueous solution based battery;
the organic solution based battery of each virtual battery becomes overcharged if it is charged beyond its final charging voltage, and gets into a dangerous state if it is charged beyond its potentially overcharging voltage, and the aqueous solution based battery of each virtual battery becomes overcharged if it is charged beyond its final charging voltage; and
when each of the plurality of virtual batteries is supplied with sufficient overcharging energy to get the organic solution based battery to become overcharged, the aqueous solution based battery carries out a hydrogen evolving reaction to absorb the overcharging energy so that a charging voltage of the virtual battery is suppressed to the final charging voltage of the aqueous solution based battery, thereby preventing the organic solution based battery from reaching its potentially overcharging voltage.

21. A power supply network system, comprising:
the power storage equipment according to claim 20;
a power supply network which connects the power storage equipment and a plurality of facilities to be supplied with electrical power such that electrical power can be supplied from the power storage equipment to the plurality of facilities to be supplied with electrical power; and
a power supply command unit that is individually installed in the plurality of facilities to be supplied with electrical power and which, in case of power failure, commands supply of electrical power to the power storage equipment and manages a quantity of electrical power as supplied through the power supply network.

* * * * *